United States Patent
Brown et al.

(10) Patent No.: US 12,093,788 B2
(45) Date of Patent: Sep. 17, 2024

(54) IMPLEMENTATION OF BATCH OPTIMIZATION FOR ROBUST TWO-QUBIT GATES FOR QUANTUM COMPUTATION

(71) Applicant: DUKE UNIVERSITY, Durham, NC (US)

(72) Inventors: Kenneth Brown, Durham, NC (US); Mingyu Kang, Durham, NC (US); Qiyao Liang, Durham, NC (US); Bichen Zhang, Durham, NC (US)

(73) Assignee: Duke University, Durham, NC (US)

( * ) Notice: Subject to any disclaimer, the term of this patent is extended or adjusted under 35 U.S.C. 154(b) by 158 days.

(21) Appl. No.: 17/720,955

(22) Filed: Apr. 14, 2022

(65) Prior Publication Data

US 2022/0343203 A1  Oct. 27, 2022

Related U.S. Application Data

(60) Provisional application No. 63/175,228, filed on Apr. 15, 2021.

(51) Int. Cl.
| | | |
|---|---|---|
| G06N 10/60 | (2022.01) | |
| G06N 5/01 | (2023.01) | |
| G06N 10/20 | (2022.01) | |
| G06N 10/40 | (2022.01) | |

(52) U.S. Cl.
CPC ............... *G06N 10/60* (2022.01); *G06N 5/01* (2023.01); *G06N 10/20* (2022.01); *G06N 10/40* (2022.01)

(58) Field of Classification Search
CPC ........ G06N 10/60; G06N 10/20; G06N 10/40; G06N 5/01

USPC ........................... 327/527; 716/100; 977/932
See application file for complete search history.

(56) References Cited

U.S. PATENT DOCUMENTS 11,416,762 B1 *  8/2022  Naveh ................... G06N 10/70

OTHER PUBLICATIONS

Rydberg-Mediated Entanglement in a Two-Dimensional Neutral Atom Qubit Array, Graham et al (published Dec. 4, 2019) Physical Rev Letters 123(2019) (Year: 2019).*
QURE: Qubit Re-allocation in Noisy Intermediate-Scale Quantum Computers, Ash-Saki et al ACM Reference Format: Abdullah Ash-Saki, (Year: 2019).*

* cited by examiner

*Primary Examiner* — Arnold M Kinkead
(74) *Attorney, Agent, or Firm* — Barnes & Thornburg LLP

(57) ABSTRACT

The present disclosure describes techniques for optimizing two-qubit gates performance in a quantum circuit of a quantum computing system. A quantum computing system selects, from qubits in the quantum circuit, a pair of target qubits on which to perform a quantum gate operation. The quantum computing system selects, from the plurality of qubits, a second plurality of qubits on which to introduce an intentional noise. The intentional noise is applied to the second plurality of qubits via a numerical optimizer. An optimized frequency is determined based on the applied intentional noise. The quantum gate operation is performed by modifying the pair of target qubits frequency to the optimized frequency.

17 Claims, 17 Drawing Sheets

IMPLEMENTATION OF BATCH OPTIMIZATION FOR ROBUST TWO-QUBIT GATES FOR QUANTUM COMPUTATION

CROSS-REFERENCED TO RELATED APPLICATIONS

This application claims the benefit of U.S. Provisional Application No. 63/175,228, filed Apr. 15, 2021, and entitled "Implementation of Batch Optimization for Robust Two-Qubit Gates for Quantum Computation." The content of this application is hereby incorporated by reference in its entirety.

FIELD

The present disclosure generally relates to quantum computing, and more specifically to optimization of two-qubit gates in a quantum computing system.

BACKGROUND

Quantum computation requires qubits that can be coupled in a scalable manner, together with universal and high fidelity one-qubit and two-qubit logic gates. Many physical realizations of qubits exist such as trapped ions, with single-qubit fidelities that exceed the stringent thresholds required for fault-tolerant quantum computing.

Trapped ion systems are one of the leading candidates for scalable quantum computing platform. In addition to the near-perfect coherence properties and single-qubit gates with error rates below $10^{-4}$, trapped ion qubits have significant advantages in entangling gate fidelities. For systems with exactly two ions, state-of-art two-qubit gates reached a fidelity higher than 99.9% by applying state-dependent force with lasers or magnetic field gradients. For larger systems, two-qubit gate fidelities higher than 99% for a four-ion chain and higher than 97% for 13-ion and 17-ion chains have been achieved. Trapped ion systems with many qubits are particularly promising as long-range Coulomb inter-actions between ions lead to all-to-all connectivity between qubits.

One of the main challenges in achieving scalability is to perform high-fidelity entangling gates with a large number of qubits. Entangling gates are performed by briefly exciting the ions' normal modes of motion, which serve as carrier of quantum information. The driving field should be carefully controlled such that all motional modes are completely disentangled from the internal qubit states at the end of the gate, while the qubit states undergo a maximally entangling operation.

In the presence of noise and parameter drifts, pulse design is necessary to achieve fast and robust high-fidelity gates. One approach is to design the amplitudes of multi-chromatic beams that suppress the effect of noise. Another approach can be controlling the amplitude, phase, and/or frequency modulation over many time segments. As the industry endeavors to create large scale quantum computing systems, optimization of two-qubit gates is imperative.

SUMMARY

Embodiments presented herein disclose techniques to improve the robustness of frequency modulated gates to motional mode frequency offsets by optimizing average performance over a range of systematic errors using batch optimization.

In one aspect, a method for optimizing two-qubit gates performance in a quantum circuit of a quantum computing system includes selecting, from a plurality of qubits in the quantum circuit, a pair of target qubits on which to perform a quantum gate operation and further selecting, from the plurality of qubits, a second plurality of qubits on which to introduce an intentional noise. The method further includes applying the intentional noise to the second plurality of qubits via a numerical optimizer, determining an optimized frequency; and performing the quantum gate operation by modifying the pair of target qubits frequency to the optimized frequency.

In some embodiments, the quantum gate operation can be a quantum entanglement gate operation. In some configuration, the intentional noise can be a change in at least one of a laser phase, laser intensity, laser amplitude, or laser frequency. In some configuration, the optimized frequency may be configured to correct any phase deviation that results in the pair of target qubits error.

In some embodiments, the method further includes determining frequencies of the qubits of the second plurality of qubits. The optimized frequency can be a function of the frequencies of the qubits of the second plurality of qubits.

In some embodiments, the method of further includes selecting a third plurality of qubits, from the plurality of qubits, in the quantum circuit, applying a second intentional noise with the numerical optimizer on the third plurality of qubits, and determining frequencies of the third plurality of qubits. In some embodiments, the optimized frequency can be a function of the frequencies of the qubits of the second plurality of qubits and the frequencies of the qubits of the third plurality of qubits.

In some embodiments, the optimized frequency is an optimized pulse frequency. In some configuration, performing the quantum gate operation further includes applying the optimized pulse frequency to the pair of target qubits.

In another aspect of the disclosure, a quantum computing system is provided. The quantum computing system includes a quantum circuit, one or more processors, and a memory having a plurality of instructions. The memory storing code when executed by the one or more processors, causes the quantum computing system to select, from a plurality of qubits in the quantum circuit, a pair of target qubits on which to perform a quantum gate operation and further select, from the plurality of qubits, a second plurality of qubits on which to introduce an intentional noise. Further, the memory storing code when executed by the one or more processors, causes the quantum computing system to apply the intentional noise to the second plurality of qubits via a numerical optimizer, determine an optimized frequency, and perform the quantum gate operation by modifying the pair of target qubits frequency to the optimized frequency.

In some configuration, the quantum gate operation can be a quantum entanglement gate operation. In some configuration, the intentional noise can be a change in at least one of a laser phase, laser intensity, laser amplitude, or laser frequency. In some embodiments, the optimized frequency is configured to correct any phase deviation that results in the pair of target qubits error.

In some embodiments, the quantum computing system further includes determine frequencies of the qubits of the second plurality of qubits, wherein the optimized frequency is a function of the frequencies of the qubits of the second plurality of qubits.

In some embodiments, the memory storing program code further causes the quantum computing system to select a third plurality of qubits, from the plurality of qubits, in the quantum circuit, apply a second intentional noise with the numerical optimizer on the third plurality of qubits, and determine frequencies of the third plurality of qubits.

In some embodiments, the optimized frequency is a function of the frequencies of the qubits of the second plurality of qubits and the frequencies of the qubits of the third plurality of qubits.

In another aspect of the disclosure, a computer-readable storage medium storing a plurality of instructions is provided. The computer-readable storage medium, which, when executed by one or more processors, causes a quantum computing system to select, from a plurality of qubits in the quantum circuit, a pair of target qubits on which to perform a quantum gate operation and select, from the plurality of qubits, a second plurality of qubits on which to introduce an intentional noise. The computer-readable storage medium further causes the quantum computing system to apply the intentional noise to the second plurality of qubits via a numerical optimizer, determine an optimized frequency, and perform the quantum gate operation by modifying the pair of target qubits frequency to the optimized frequency.

In some embodiments, the quantum gate operation is a quantum entanglement gate operation. In some embodiments, the intentional noise can be a change in at least one of a laser phase, laser intensity, laser amplitude, or laser frequency. In some configuration, the optimized frequency can be configured to correct any phase deviation that results in the pair of target qubits error. In some embodiments, the quantum computing system further includes to determine frequencies of the qubits of the second plurality of qubits, wherein the optimized frequency is a function of the frequencies of the qubits of the second plurality of qubits.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
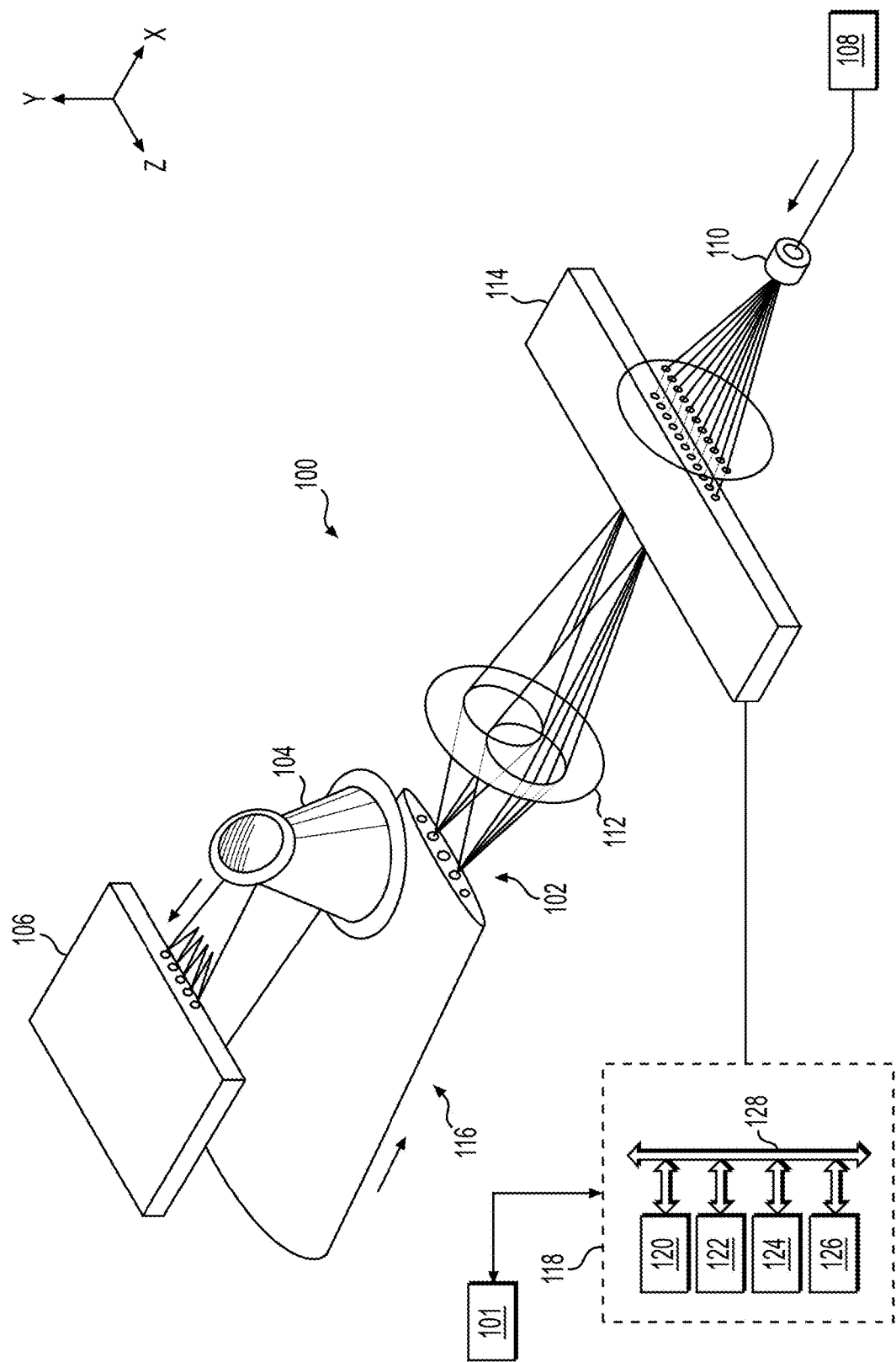
FIG. 1 is a partial view of an example ion trap quantum computer configured to optimize two-qubit gates, according to an embodiment.

Two-qubit gates in trapped ion quantum computers are generated by applying spin dependent forces that temporarily entangle the internal state of the ion with its motion. In general, the quality of the gates suffers when actual experimental parameters differ from the ideal case. The methods describe how laser pulses are carefully designed to generate a maximally entangling gate between the ions while minimizing any residual entanglement between the motion and the ion. The describe methods and systems improve the robustness of frequency modulated Mølmer-Sorensen (MS) gates to motional mode frequency offsets by optimizing average performance over a range of systematic errors using batch optimization. Further, the disclosure compares this method with frequency modulated gates optimized for ideal parameters that include an analytic robustness condition. The numerical simulations show good performance up to 12 ions and the method is experimentally demonstrated on a two-ion chain.

Currently, the existing methods lead to analytic robustness by guaranteeing high fidelity up to a certain order for uncertainty in a control parameter. However, there are still errors in applying these methods. The present disclosure provides a method to achieve robust pulse numerically using machine learning (ML)-inspired optimization algorithms. In particular, training with a large sample set and mini-batches of parameter offsets significantly improves the robustness of the optimized pulse on a generic Hamiltonian with control fields. For trapped ion systems, the techniques described herein may use deep reinforcement learning to develop robust single-qubit gates.

The system and methods described herein improve the existing robust frequency modulation (FM) scheme (and accordingly, the performance of the underlying quantum computing system) by applying ML-inspired techniques, using a large sample set and mini-batches respectively in a quantum computing system, such as a trapped ion system. The techniques directly enforce robustness is by defining cost function as displacement and angle errors averaged over various values of motional frequency offsets. The present disclosure demonstrates that large sample set (sample-robust or s-robust) and mini-batch (batch robust or b-robust) FM robustness significantly improves from that of robust FM, finding pulse solutions with multiple peaks in the fidelity landscape. Further, the present disclosure shows the scalability of b-robust FM, in terms of high average fidelity, a low laser power requirement, and reasonable optimization runtime for up to 12 ions. Furthermore, the disclosure provides experimental results that demonstrate improved robustness when using b-robust FM. As shown, e.g., in FIGS. 6A-6B, b-robust FM has more significant advantages over robust FM in more complicated experiments with larger number of ions and uncertainty in motional frequencies.

The method presented herein can be extended to other types of pulse modulation and noise. For example, while the present disclosure achieves robustness to motional mode frequency offsets as an example, the method may be adapted to noise in other physical parameters, such as laser intensity and phase. Also, it can be applied to mini-batch optimization scheme that finds pulse solutions that are robust to fast time-varying noise, when combined with quantum oscillator noise spectroscopy.

Note, the present disclosure uses a trapped ion quantum computer as a reference example for optimizing two-qubit gate errors by applying a noise to a plurality of qubits and observe their frequency change to determine optimized frequency of a particular two-qubit gate. However, one of skill in the art will recognize that in addition to trapped ion quantum computers, the embodiments may be adapted to other types of quantum computing systems (e.g., quantum annealing systems, superconductor circuit quantum computers, spin qubit quantum computers, etc.).

The disclosure improves on previous discrete and continuous frequency modulation (FM) schemes. Embodiments presented herein disclose two algorithms for FM pulse optimization by training with large sample set and mini-batches, namely, sample-robust and batch-robust.

FIG. 1 is a partial view of an example ion trap quantum computer, or system 100, that may implement the techniques described herein, according to one embodiment. The system 100 includes a classical (digital) computer 101, a system controller 118 and a quantum register that is a chain 102 of trapped ions (i.e., five shown) that extend along the Z-axis. The classical computer 101 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 104, such as an objective lens with a numerical aperture (NA), for example, of 0.37, collects fluorescence along the Y-axis from the ions and maps each ion onto a multi-channel photo-multiplier tube (PMT) 106 for measurement of individual ions. Non-copropagating Raman laser beams from a laser 108, which are provided along the X-axis, perform operations on the ions. A diffractive beam splitter 110 creates an array of static Raman beams 112 that are individually switched using a multi-channel acousto-optic modulator (AOM) 114 and is configured to selectively act on individual ions. A global Raman laser beam 116 illuminates all ions at once.

The system controller (also referred to as a "RF controller") 118 controls the AOM 114. The system controller 118 includes a central processing unit (CPU) 120, a read-only memory (ROM) 122, a random access memory (RAM) 124, a storage unit 126, and the like. The CPU 120 is a processor of the RF controller 118. The ROM 122 stores various programs and the RAM 124 is the working memory for various programs and data. The storage unit 126 includes a nonvolatile memory, such as a hard disk drive (HDD) or a flash memory, and stores various programs even if power is turned off. The CPU 120, the ROM 122, the RAM 124, and the storage unit 126 are interconnected via a bus 128.

The RF controller 118 executes a control program which is stored in the ROM 122 or the storage unit 126 and uses the RAM 124 as a working area. The control program will include software applications that include program code that may be executed by processor in order to perform various functionalities associated with receiving and analyzing data and controlling any and all aspects of the methods and hardware used to create the ion trap quantum computer system 100 discussed herein. For example, the control program may include program code for optimizing two-qubit gates performances by optimizing their frequency, such as program code for receiving information of a quantum circuit of the system 100 in which to perform the quantum gate operation, selecting target qubits of the quantum system on which to perform the quantum gate operation, selecting a second plurality of qubits on which to introduce an intentional noise, introducing the intentional noise via a numerical optimizer on the second plurality of qubits, determining frequencies of the qubits of the second plurality of qubits, determining an optimized frequency, and performing the quantum gate operation.

Figure 2:
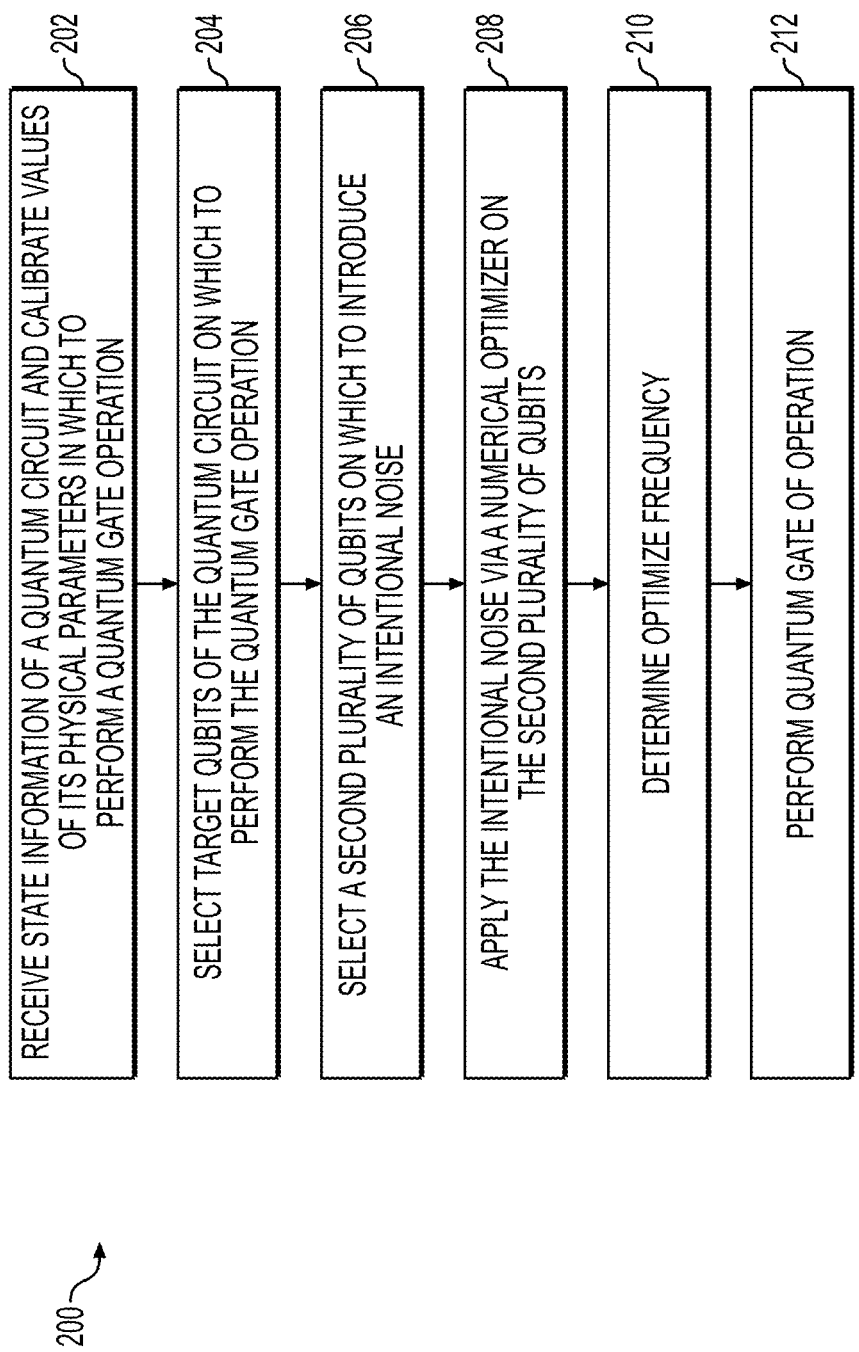
FIG. 2 is a flow diagram of an example method for optimizing two-qubit gates, according to an embodiment.

Referring now to FIG. 2, the system 100, in operation, may perform a method 200 for optimizing two-qubit gates. As shown, the method 200 begins in block 202, in which the system 100 ascertains quantum state information of a quantum circuit and calibrates values of its physical parameters to perform a quantum gate operation, such as a quantum entanglement gate operation. In block 204, the system 100 selects target qubits in the quantum circuit on which to perform the quantum gate operation. In block 206, the system 100 selects a second plurality of qubits on which to apply an intentional noise. After selecting the second plurality of qubits, in block 208, the system 100 applies intentional noise to the plurality of qubits to a numerical optimizer. The intentional noise can be a change in trap frequency, laser phase, laser intensity, or laser frequency. As the frequency of the trap may drift during the operation of the system, understanding how ions or quantum gates behave when there is a noise, e.g., change in trap frequency or any noise stated above, helps to optimize the quantum gates operation. The numerical optimizer takes the values of the physical parameters obtained in block 202 as inputs, and minimizes the gate error in the presence of noise injected in block 208. In block 210, the system 100 observes the performance of each qubits of the plurality of qubits and determines their frequencies. Based on these results, the system 100 determines an optimized pulse frequency for the pair of the target qubits to optimize the gate performance. The optimized pulse frequency is configured to correct any phase deviation that results in the pair of target qubits error. In block 212, the system 100 performs the quantum gate operation, targeting the selected pair of qubits. In some embodiments, the method steps in blocks 202 through 212 are repeated during the operation of the system 100 to continuously optimize the two-qubit gates performance.

The system 100 applies a frequency-modulated MS gate by state-dependent force with lasers of drive frequency modulated near the sideband frequencies. When addressed by lasers, the ions $j_1$ and $j_2$ undergo the unitary evolution described by the following:

$$U(\tau) = \exp(\Sigma_{j,k}(\alpha_k^j(\tau)\hat{a}_k^\dagger - \alpha_k^{j*}(\tau)\hat{a}_k)\sigma_\phi^j + i\Theta(\tau)\sigma_\phi^{j_1}\sigma_\phi^{j_2}) \quad (1)$$

where $$\alpha_k^j(\tau) = \frac{\Omega}{2}\eta_k^j \int_0^\tau e^{-i\theta_k(t)} dt \quad (2)$$

$$\Theta(\tau) = -\frac{\Omega^2}{2}\sum_k \left(\eta_k^{j_1}\eta_k^{j_2}\int_0^\tau dt_1 \int_0^{t_1} dt_2 \sin(\theta_k(t_1) - \theta_k(t_2))\right) \quad (3)$$

in which $\tau$ is the pulse length, $\Omega$ is the carrier Rabi frequency, $\eta_k^j$ ($j=j_1, j_2$) is the Lamb-Dicke parameter of ion j with respect to motional mode k, and $\sigma_\phi^j$ is the bit-flip Pauli operator of ion j. Also $$\theta_k(t) = \int_0^t (\mu(t') - \omega_k) dt' \quad (4)$$

is the phase of motional mode k, which is the integral of detuning between the drive frequency $\mu(t)$ and mode frequency $\omega_k$. The first term in Eq. 1 describes state-dependent displacement of the motional modes, while the second term represents rotation with respect to the two-qubit axis $\sigma_\phi^{j_1}\sigma_\phi^{j_2}$.

For an ideal MS gate, the qubits should be completely disentangled from the motional modes ($\alpha_k^j(\tau) = 0 \forall j, k$), and the rotation angle $\Theta(\tau)$ should reach exactly $\pi/4$. Hence, the goal of robust FM is to modulate the drive frequency profile $\mu(t)$ such that $\alpha_k^j(\tau)$ and $|\Theta(\tau) - \pi/4|$ are sufficiently minimized, in the presence of mode frequency offsets $\epsilon_k$, i.e. $\omega_k \to \omega_k + \epsilon_k$.

Minimizing $|\alpha_k^j(\tau)| \propto |\int_0^\tau e^{-i\theta_k(t)} dt|$ is the intuitive criterion for an optimized gate. However, such gate is sensitive to small changes $\epsilon_k \ll 1/\tau$. However, in some instances, robustness is induced by minimizing the time-averaged displacement $$|a_{k,avg}^j| \propto \frac{1}{\tau}\left|\int_0^\tau \int_0^t e^{-i\theta_k(t')} dt' dt\right|,$$

which is proportional to the first-order correction of $|\alpha(\tau)|$ when $\omega_k \to \omega_k + \epsilon_k$. The time-symmetric pulse can be used to guarantee that minimizing $|\alpha_{k,avg}^j|$ also minimizes $|a_k^j(\tau)|$. This optimization scheme, in this disclosure being referred to as "robust FM".

Although robust FM is shown to be robust to mode frequency offsets that are an order of magnitude smaller than $1/\tau$, it does not guarantee robustness to $\epsilon_k \lesssim 1/\tau$. Moreover, robustness of the angle $\Theta(\tau) \approx \pi/4$ is not enforced by this method.

The present disclosure describes applying machine learning with large sample set and mini-batches to quantum control. That is, the present disclosure provides a large sample set (sample-robust or s-robust) and mini-batch (batch robust or b-robust) FM, which further enhances the robustness of the two-qubit gate. Instead of minimizing the analytic first order correction, we minimize the average of $|\alpha_k^j(\tau)|^2$ over an ensemble of offsets, thereby directly incorporating the robustness condition into the cost function. Further, the described methods include the robustness condition of the angle $\Theta(\tau)$ in the cost function. One of the novel features of the disclosure is to optimize robustness of angle which is crucial to reach high fidelity in the presence of motional frequency drifts. The optimal FM pulse $\mu(t)$ that minimizes the following cost function $C_\epsilon$ is:

$$C_\varepsilon = \frac{1}{|S_\varepsilon|}\sum_{k \in S_\varepsilon} C(\epsilon) \quad (5)$$

$$C(\epsilon) = \sum_k \left(\alpha_k^{j_1}(\tau, \epsilon)^2 + \alpha_k^{j_2}(\tau, \epsilon)^2\right) + \frac{1}{2}\left(\Theta(\tau, \epsilon) - \frac{\pi}{4}\right)^2$$

Here, $\varepsilon$ is the motional frequency uncertainty, and $S_\varepsilon$ consists of offset vectors $\rho$ whose components $\epsilon_k$ are independently and randomly drawn from the normal distribution $\mathcal{N}(0, \varepsilon) \cdot \alpha_k^j(\tau, \epsilon)$ and $\Theta(\tau, \epsilon)$ are displacement and angle when $\omega_k \to \omega_k + \epsilon_k$. The two terms of $C(\epsilon)$ are simply the displacement error representing residual entanglement with the phonons and the angle error.

In one embodiment, the carrier Rabi frequency $\Omega$ is updated at each interaction such that $\Theta(\tau, 0) = \pi/4$. Since the displacement error is $\propto \Omega^2$ and angle error is $\propto \Omega^4$, this cost function finds the low $\Omega$ solution. This is different from robust FM approach, which sets $\Omega$ after the entire optimization. As a result, it requires explicit regularization to fit the experimental constraints.

For s-robust FM, $S\varepsilon$ is set as a fixed training set throughout the optimization. For b-robust FM, $S\varepsilon$ is set as a batch, which gets randomly updated at each iteration of the optimization. Therefore, while s-robust FM calculates the cost function repeatedly with a certain set of samples, b-robust FM computes the cost function with a different batch generated from the error distribution throughout the entire optimization. In one embodiment, the training set is sized as 100 for s-robust and batch size as 10 for b-robust. For the batch method, the adaptive moment estimation (ADAM) optimizer is used to stabilize the gradient during training.

Figure 3A:
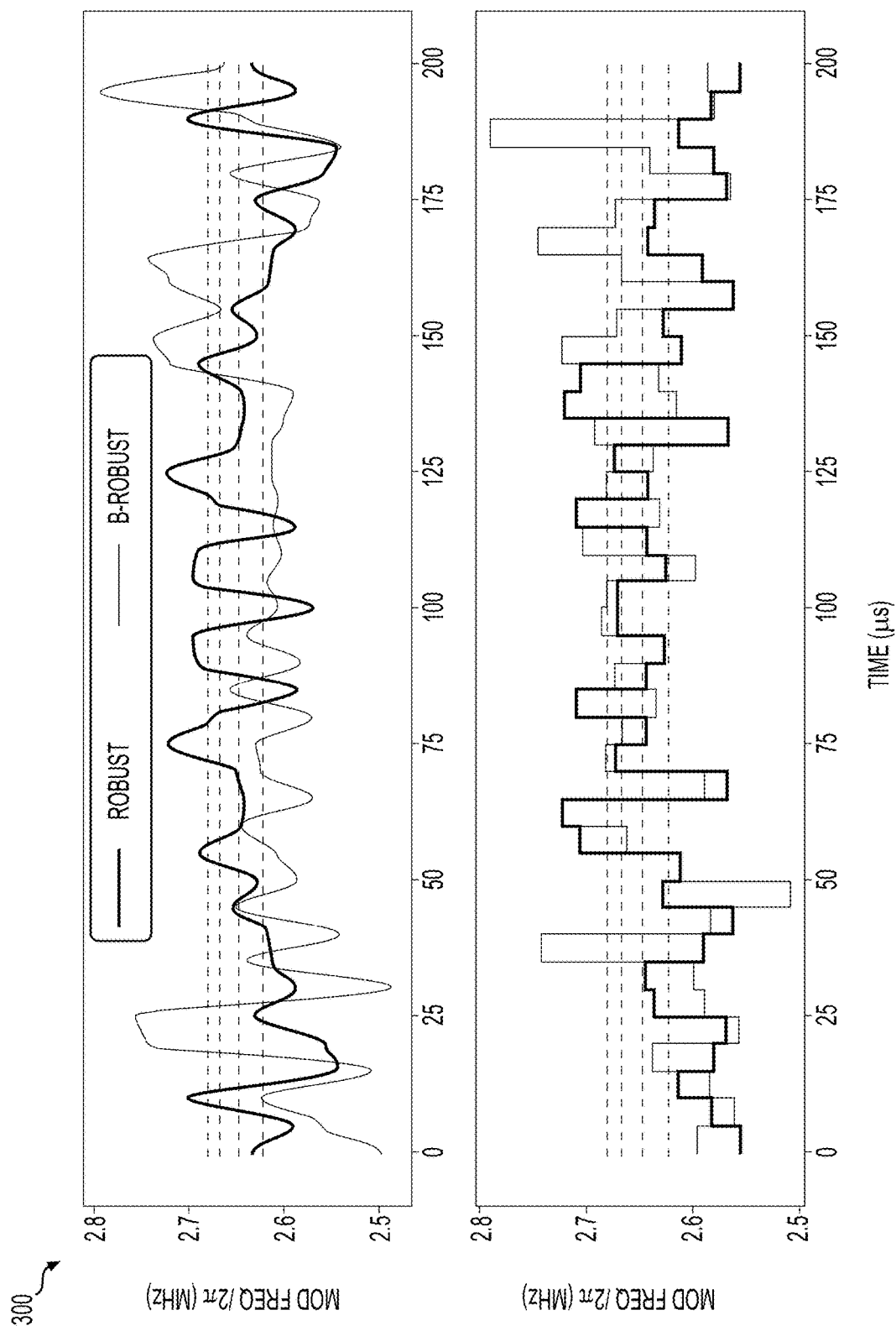
FIG. 3A is a graph of continuous and discrete pulses from robust and b-robust frequency modulation (FM) optimization over a four-ion chain, according to an embodiment.

FIG. 3A illustrates graph 300 representing results of an example embodiment with continuous and discrete pulses from robust and b-robust FM optimization over a four-ion chain. As shown, b-robust pulses do not have the even-pulse constraint, thus having twice as many degrees of freedom as robust pulses. This allows b-robust FM to explore a wider range of pulse shapes. Continuous and discrete pulses have different time complexities of evaluating the gradient of angle $\Theta(\tau)$ over the pulse $\mu(t)$, which is the most time-consuming routine of the optimization. For continuous pulses, each neighboring steps are connected by sub-steps that follow a cosine envelope, and the evaluation time is quadratic to the number of sub-steps. However, for discrete pulses, the stepwise-constant form allows efficient evaluation of the gradient of $\Theta(\tau)$, requiring time linear to the number of steps.

Figure 3B:
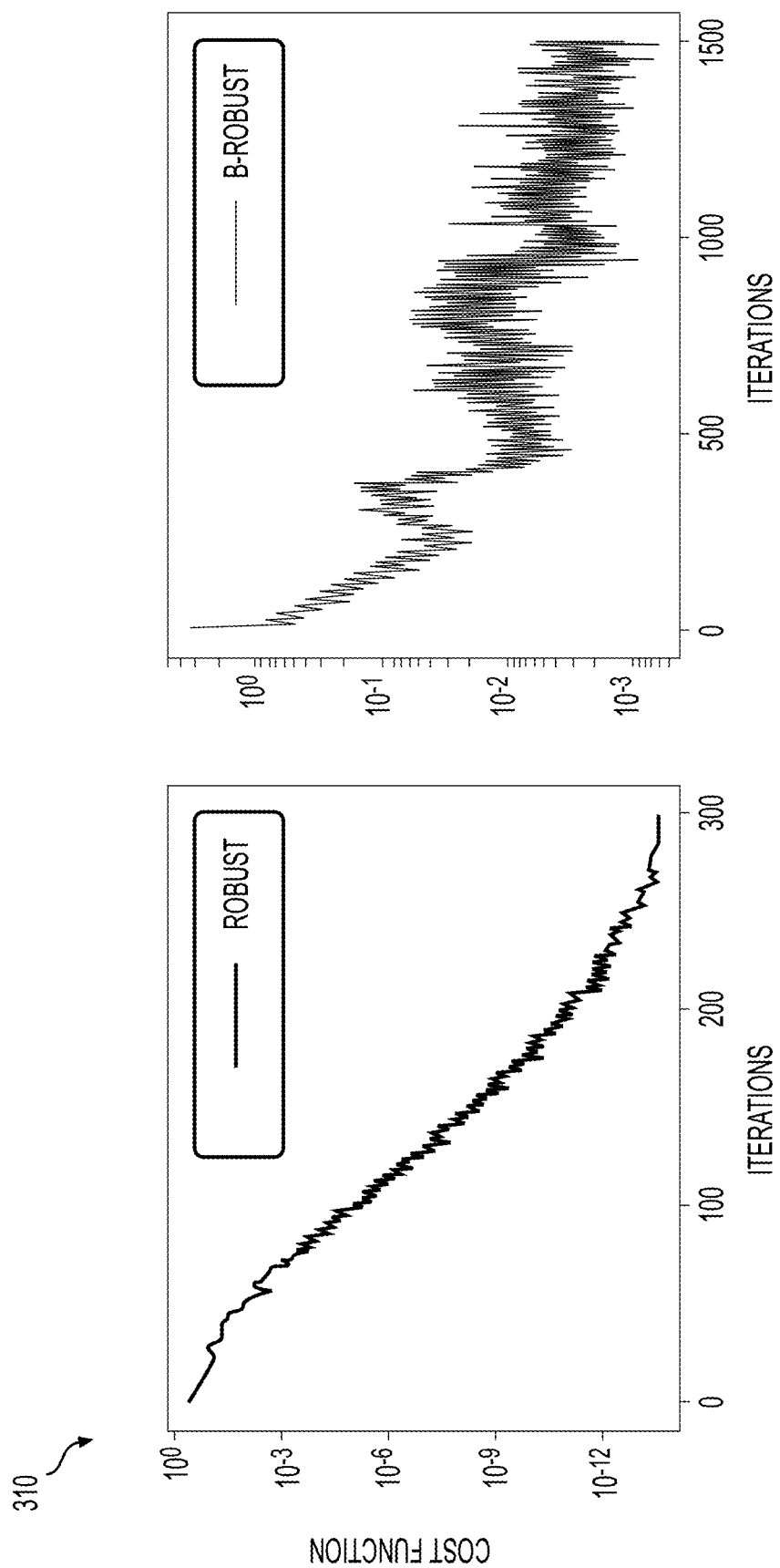
FIG. 3B is a graph of learning curves of robust and b-robust FM optimization of FIG. 3A.

FIG. 3B shows graph 310 representing the learning curves of robust and b-robust optimization. For robust FM, the training loss quickly and smoothly drops to lower than $10^{-6}$. However, this only guarantees very accurate gate solution at close to zero offsets. Meanwhile, for b-robust FM, the motional frequency uncertainty $\varepsilon$ is $2\pi \cdot 1$ kHz. The training loss experiences larger fluctuations as a new batch of parameter offsets are used for optimization at each iteration. Although the training loss only reaches approximately $10^{-3}$, the gate fidelity is robust (reaching $10^{-3}$) against all mode frequency offsets within the optimized range.

To evaluate the robustness performance, the average unitary gate fidelity was calculated over the test set $T\varepsilon$ of mode frequency offsets. The unitary fidelity can be expressed as $$\mathcal{F} = \frac{1}{D} Tr(\mathcal{U}^\dagger U(\tau)),$$

where $U(\tau)$ is the unitary evolution in Eq. (1), U is the target unitary, and D is the Hilbert space dimension. Up to second order in the error terms of displacement and angle, the average fidelity can be expressed as the following:

$$\mathcal{F}_\varepsilon = \frac{1}{|T_\varepsilon|} \sum_{\epsilon \in T_\varepsilon} \mathcal{F}(\epsilon) \qquad (6)$$

$$\mathcal{F}(\epsilon) = \cos\left(\Theta(\tau, \epsilon) - \frac{\pi}{4}\right) \cdot \left(1 - \sum_k (\alpha_k^{j1}(\tau, \epsilon)^2 + \alpha_k^{j2}(\tau, \epsilon)^2)\left(\bar{n}_k + \frac{1}{2}\right)\right)$$

where $\bar{n}_k$ is the mean phonon number of mode k and $T_\varepsilon$ is the test set of motional frequency uncertainty $\varepsilon$, constructed similarly as $S\varepsilon$. In order to evaluate robustness, the test set is completely random and independent of the training set or mini-batches for optimization. The test set size is set as 1000. For zero phonon number and to leading order of errors, fidelity is simply equal to one minus the cost function: $\mathcal{F}(\epsilon) = 1 - C(\epsilon)$.

Figure 4A:
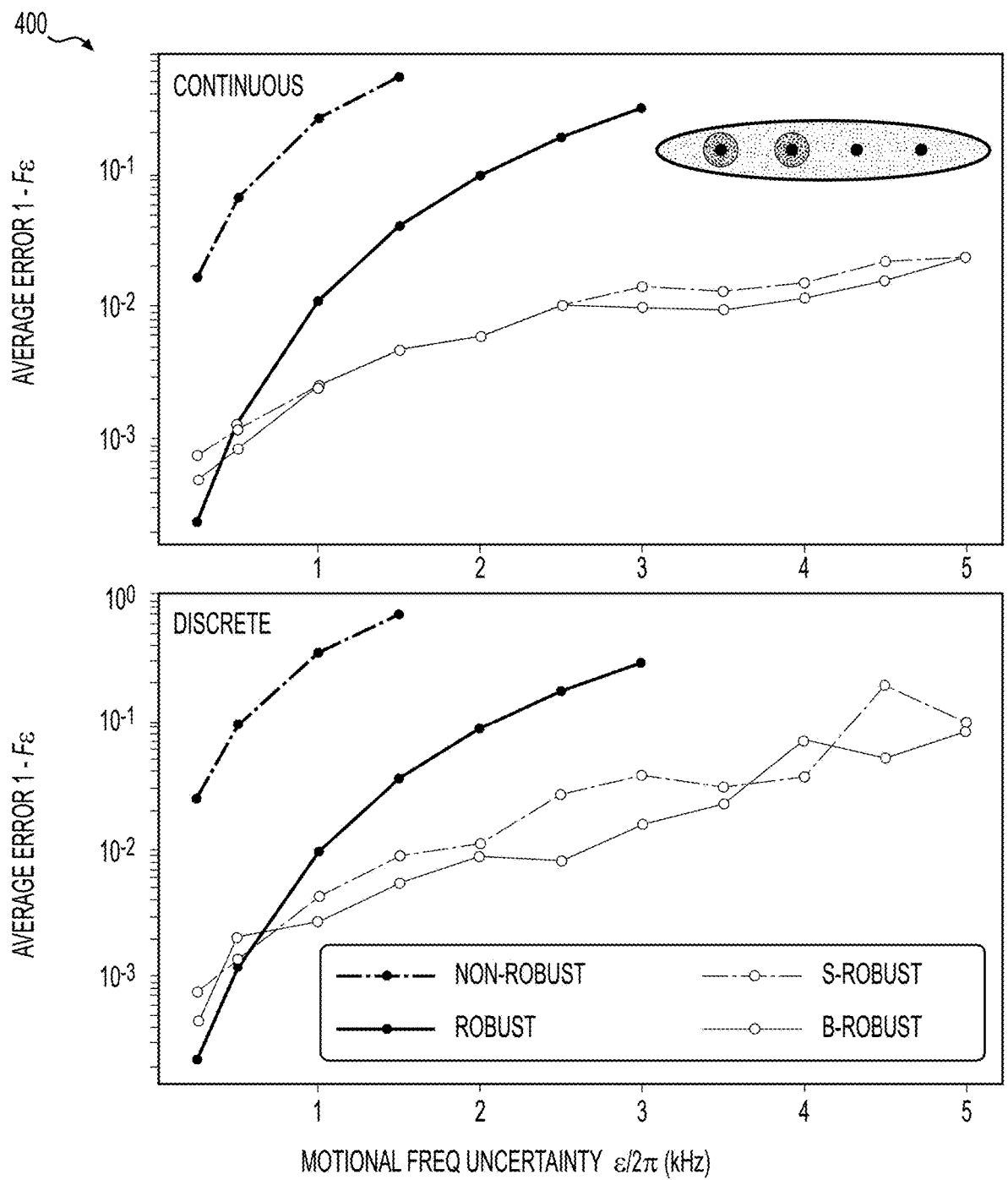
FIG. 4A shows graphs of simulated average error $1-\mathcal{F}\epsilon$ of pulses optimized by non-robust, robust, s-robust, and b-robust FM method for various values of mode frequency uncertainty $\epsilon$, according to an embodiment.

FIG. 4A shows graph 400 representing the simulated average error $1 - \mathcal{F}(\epsilon)$ of pulses optimized by non-robust, robust, s-robust, and b-robust FM, for various values of mode frequency uncertainty $\varepsilon$ performed in blocks 210 and 212. In this example embodiment, 200 μs pulse was used to perform MS gate on the first two ions in a four-ion chain. Grey lines are the sideband frequencies of a 4-ion chain. Robust FM pulses are time symmetric, while b-robust FM pulses are not. Each point of s-robust and b-robust data is optimized with the respective range $\varepsilon$. 300 iterations was performed for non-robust and robust FM and 1500 iterations for s- and b-robust FM. Since optimization performance depends to a slight degree on the choice of random initial guess pulse, ten trials were performed and the optimized pulse with the best average fidelity over a cross-validation set was chosen to construct randomly and independently from the test set. As a result, s-robust and b-robust pulses have significantly smaller average error than robust pulses, for error range $\varepsilon/2\pi \geq 0.5$ kHz with continuous pulses, and for $\varepsilon/2\pi \geq 1$ kHz with discrete pulses. Notably, continuous s-robust and b-robust pulses have 0.99 average fidelity over an offset range of $\varepsilon/2\pi \leq 5$ kHz. This shows that s-robust and b-robust FM can be robust to offsets as large as the inverse of pulse length $1/\tau$. In general, b-robust performs slightly better than s-robust, despite having ten times less number of cost function and gradient evaluations than s-robust. Except when $\varepsilon$ is too small, s-robust and b-robust FM are significantly more robust than robust FM. This can be understood as the advantage of exploring various values of offset $\varepsilon$, thus reducing the gap between the training curve and the testing curve.

Figure 4B:
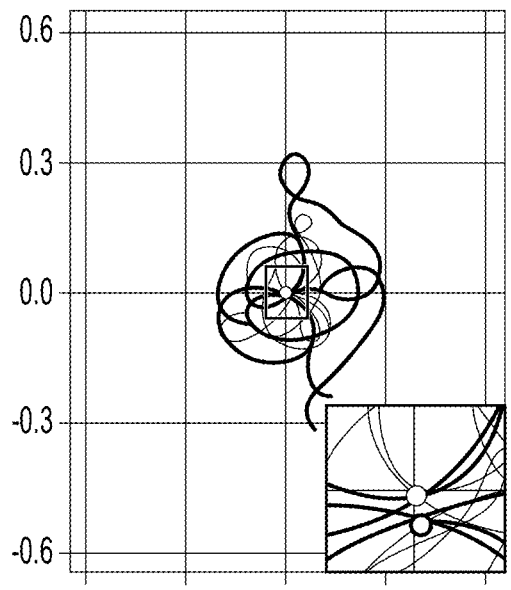
FIGS. 4B-4C illustrate the displacement and angle errors of robust and b-robust pulses where the motional mode frequencies are drifted by $\rho_k/2\pi=1$ kHz for four modes, according to an embodiment.
Figure 4B:
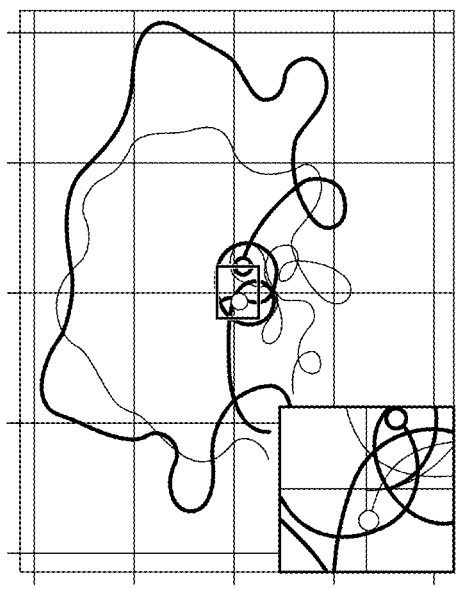
Figure 4B:
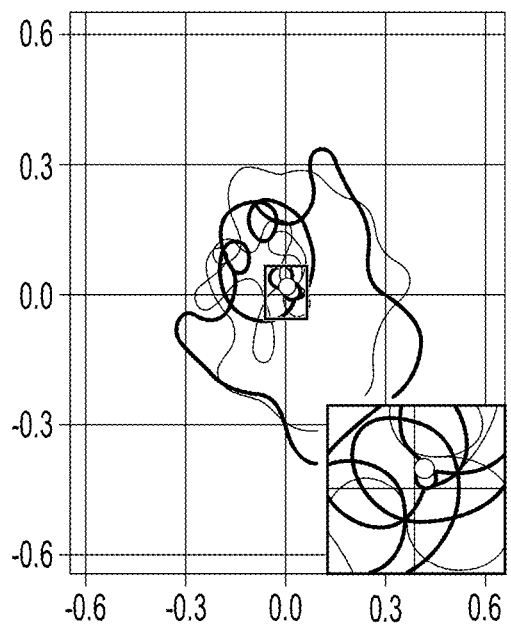
Figure 4B:
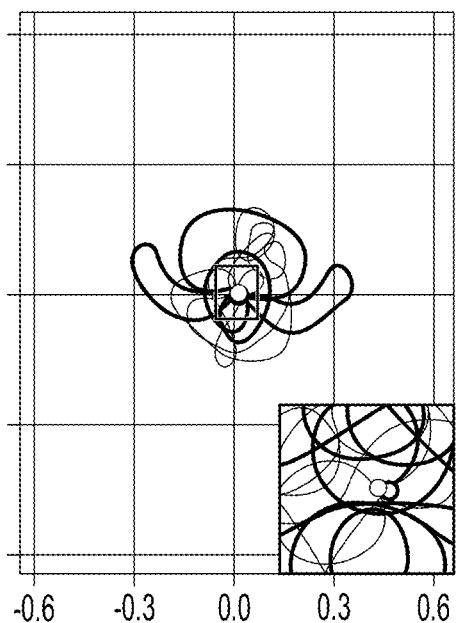
Figure 4C:
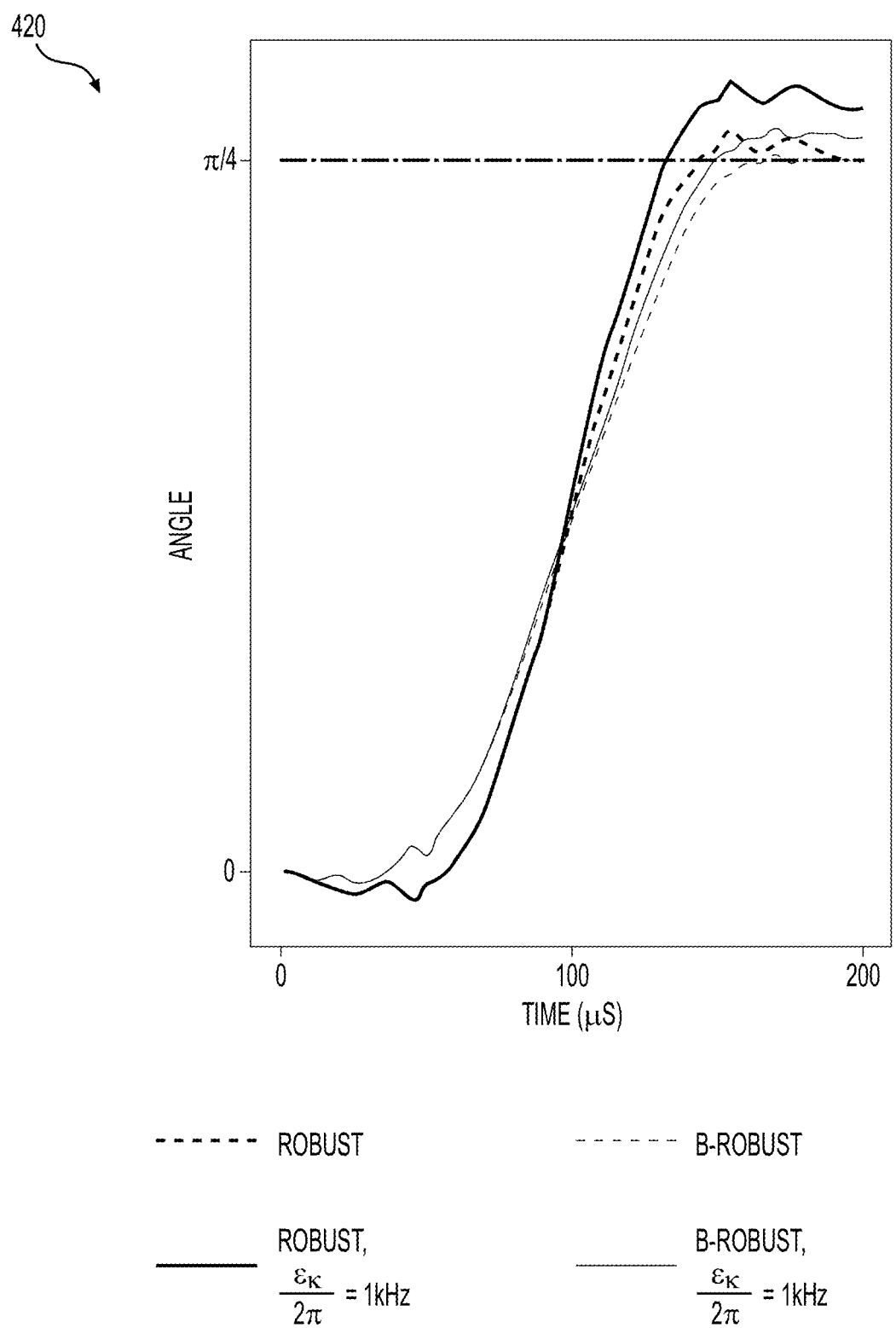

FIGS. 4B and 4C illustrate the displacement and angle errors of robust and b-robust pulses where the motional mode frequencies are drifted by $\varepsilon/2\pi \geq 1$ kHz for all four modes. As expected, the b-robust pulse has smaller errors in both displacement and angle. Referring to FIG. 4B, graph 410 represents displacements at the end (circles) are overall closer to the origins when b-robust pulse is applied. FIG. 4C shows graph 420 representing angle $\Theta(\tau)$ during when discrete robust and b-robust pulses are applied. When no drifts occurred (dashed lines), angle reaches exactly $\pi/4$ at the end of both robust and b-robust pulses. When uniform drift of 1 kHz occurs (solid lines), angle is closer to $\pi/4$ when b-robust pulse is applied. For both FIGS. 4B and 4C, b-robust pulse is optimized over $\varepsilon = 2\pi \cdot 1$ kHz.

Figure 5:
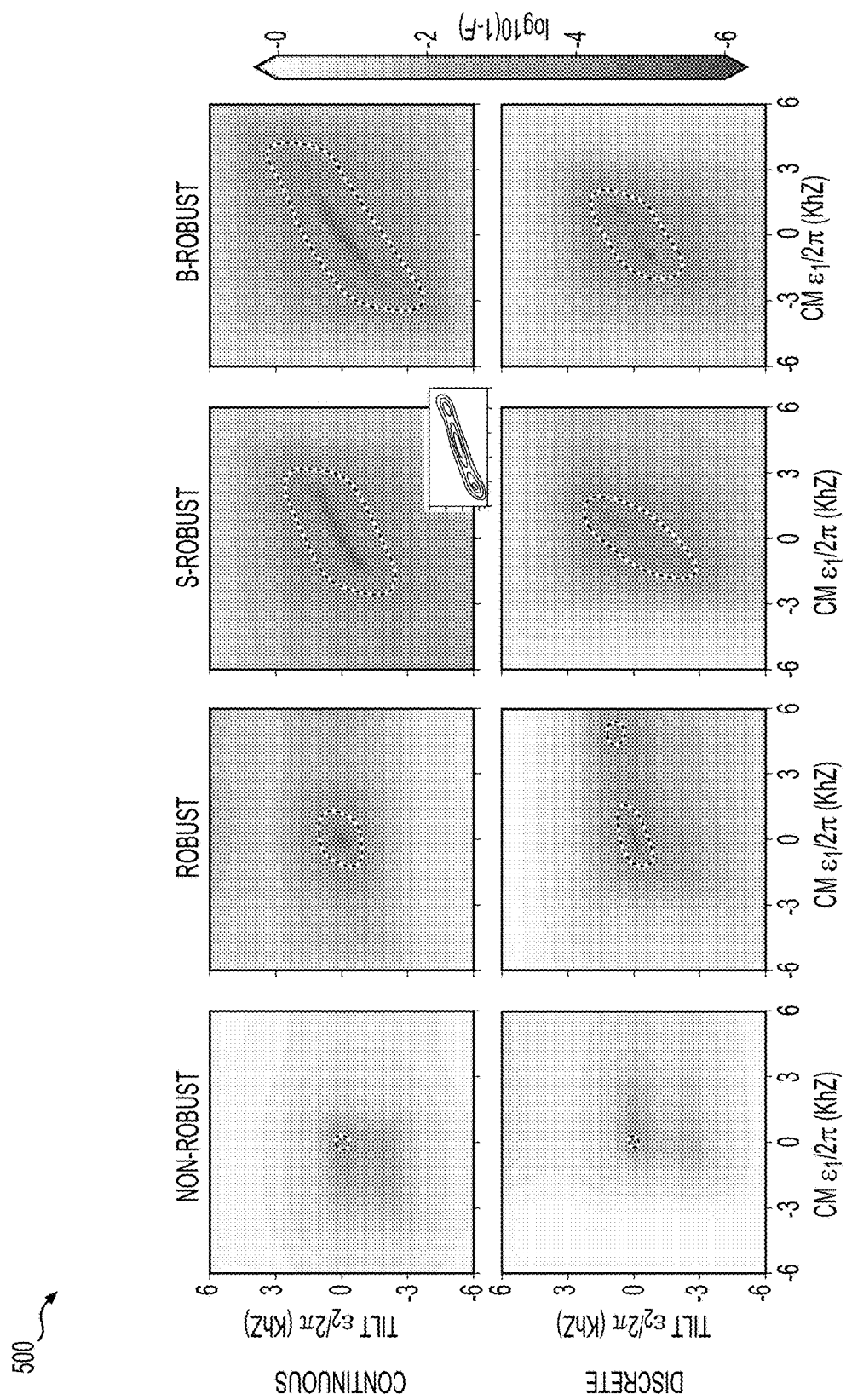
FIG. 5 plots the error landscapes over motional frequency offsets non-robust, robust, s-robust, and b-robust FM, according to an embodiment.

FIG. 5 illustrates diagram 500 representing the error landscapes over motional frequency offsets. In this example, a 200 μs pulse for MS gate on a two-ion chain with offsets of center of mass mode ($\epsilon_1$) and tilt mode ($\epsilon_2$) are used. Further, both continuous and discrete pulses are used. As shown, the s-robust and b-robust pulses are optimized over mode frequency uncertainty $\epsilon/2\pi = 1$ kHz. The "high-fidelity regions" in which error is less than $10^{-3}$ are marked with dashed contour lines. For continuous pulses, the high-fidelity region is 4.5 and 6.4 times larger with s-robust and b-robust pulse, respectively, than with the robust pulse. For discrete pulses, the high fidelity region is 2.8 times larger with both s-robust and b-robust pulses than with robust pulse. Accordingly, significantly enhanced robustness with s-robust and b-robust FM is achieved. Further, continuous b-robust pulse has 2.5 times larger high-fidelity region than discrete b-robust pulse.

The error landscapes of s-robust and b-robust pulses have two or three peaks of high fidelity that are clearly separated from the origin. The average position of the peaks is near the origin, thus guaranteeing high fidelity at zero-offset as well. A large high-fidelity region that encompasses all peaks is formed. These results show that how s-robust and b-robust FM are able to achieve significantly better robustness than robust FM, whose landscape has a single sharp peak at the origin.

Unlike various generic pulse optimization algorithms whose computational cost increases exponentially with the number of qubits, robust FM for trapped ion system has linear computational cost, which makes the algorithm applicable for large-scale systems. The disclosed b-robust FM also has this advantage.

Figure 6A:
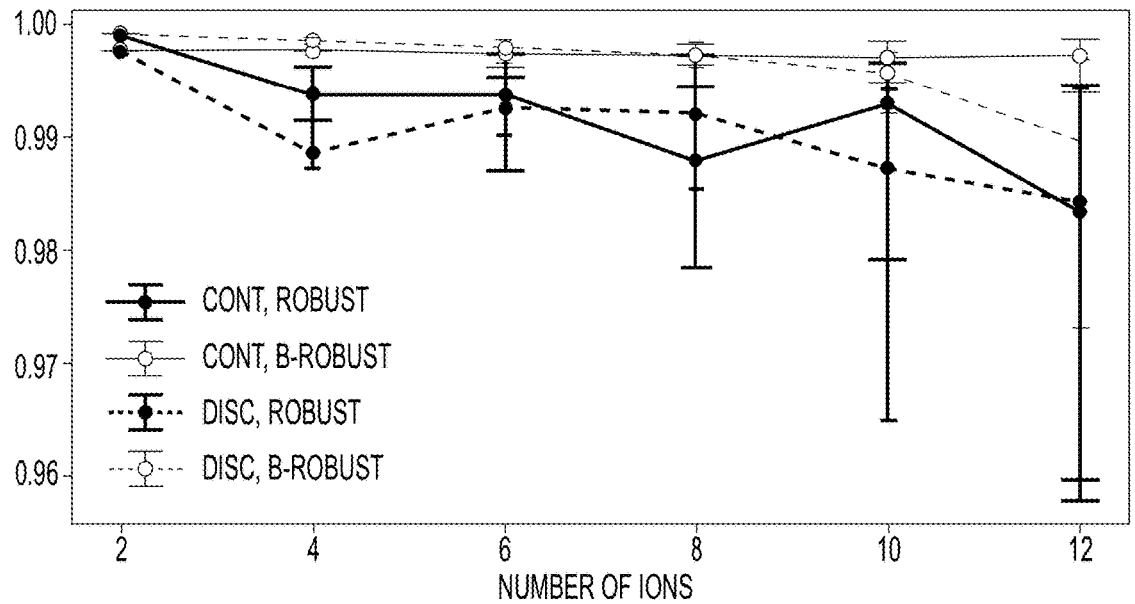
FIG. 6A is a graph of average fidelity $\mathcal{F}\epsilon$, with $\epsilon/2\pi=0.5$ kHz, according to an embodiment.
Figure 6B:
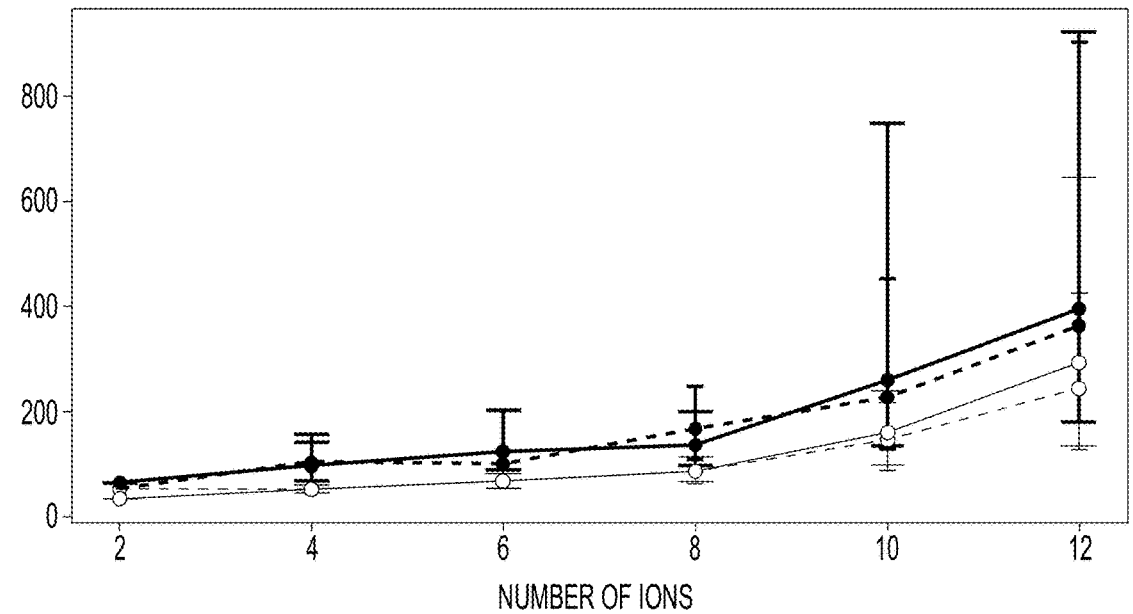
FIG. 6B is a graph of the Rabi frequency $\Omega$, according to an embodiment.
Figure 6C:
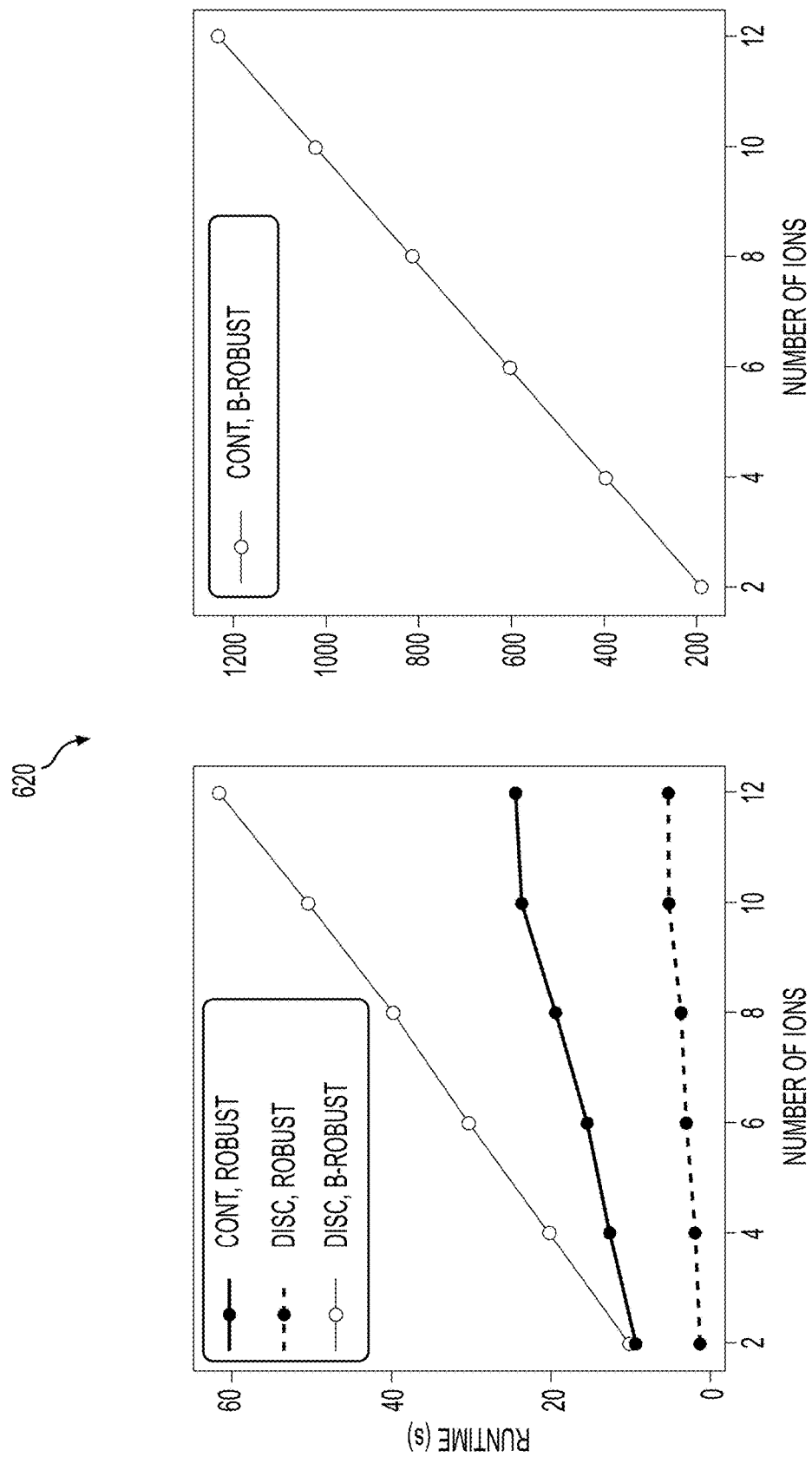
FIG. 6C is a graph of runtime of single pulse optimization of robust and b-robust FM method, according to an embodiment.

FIGS. 6A-6C show the performance of robust and b-robust FM optimized in ion chains in a harmonic trap potential, with number of ions ranging from 2 to 12. In one embodiment, MS gates on all pairs of ions are simulated for 2 and 4 ion chains. For ion chains of length $N \geq 6$, MS gates on all pairs in the sub-chain of length $N-2$, excluding the ions at the edges, are simulated. The error bars indicate the standard deviation over the ion pairs. For both continuous and discrete, 400 μs pulses are used. The b-robust pulses are optimized over motional frequency uncertainty $\epsilon/2\pi = 0.5$ kHz. Only for continuous b-roust optimization, the displacement error $C(\epsilon) = \Sigma_k(\alpha_k^{j1}(\tau, \epsilon)^2 + \alpha_k^{j2}(\tau, \epsilon)^2)$ was minimized instead of entire error as in Eq. (5). In this simulation, 1500 iterations are performed for each optimization.

FIG. 6A shows graph 600 representing the average fidelity $\mathcal{F}(\epsilon)$, where $\Sigma/2\pi = 0.5$ kHz. FIG. 6B shows graph 610 which is a graph of Rabi frequency $\Omega$. For both continuous and discrete pulses, b-robust FM finds the pulse solution with higher average fidelity and lower $\Omega$, and the advantages are more significant as the number of ions increases. The explicit regularization of $\Omega$ is possible for both methods, but at the cost of lower average fidelity. Nonetheless, the cost function of b-robust FM scales as $\Omega^4$ (or $\Omega^2$) with the frequency offset, which naturally leads to convergence to low Ω solution. Based on these results, further reduction in Ω is possible by carefully choosing the initial guess pulse for each pair of ions, as well as designing the shape of trap potential for even spacing between ions.

FIG. 6C illustrating graph 620 which is a graph of the runtime of single pulse optimization of each FM method, executed in a standard consumer laptop (with 1.60 GHz Intel Core i5 CPU and 16.0 GB RAM). As shown, runtimes scale linearly with the number of ions. Runtime of discrete b-robust FM is more than ten times longer than that of discrete robust FM due to batch size of 10 and additional computation of $\Theta(\tau)$. Even in 12 ion chain, discrete b-robust FM optimizes within approximately 1 minute.

For continuous b-robust FM, the runtime is approximately 20 times longer than discrete b-robust FM, even though only the displacement error was minimized. The most time-consuming routine is evaluating $\Omega \propto \Theta(\tau, 0)^{1/2}$ and its gradient after each iteration, which is quadratic to the number of sub-steps in the continuous case. The results show that continuous b-robust FM is still a promising scheme for larger-scale systems, as for a 12-ion chain, $\mathcal{F}(\epsilon)$ is significantly higher (average 99.7% over ion pairs) than the other FM methods. The runtimes could be improved by parallelization using GPUs, development of faster algorithms for continuous pulses, and overall code optimization.

Figure 7A:
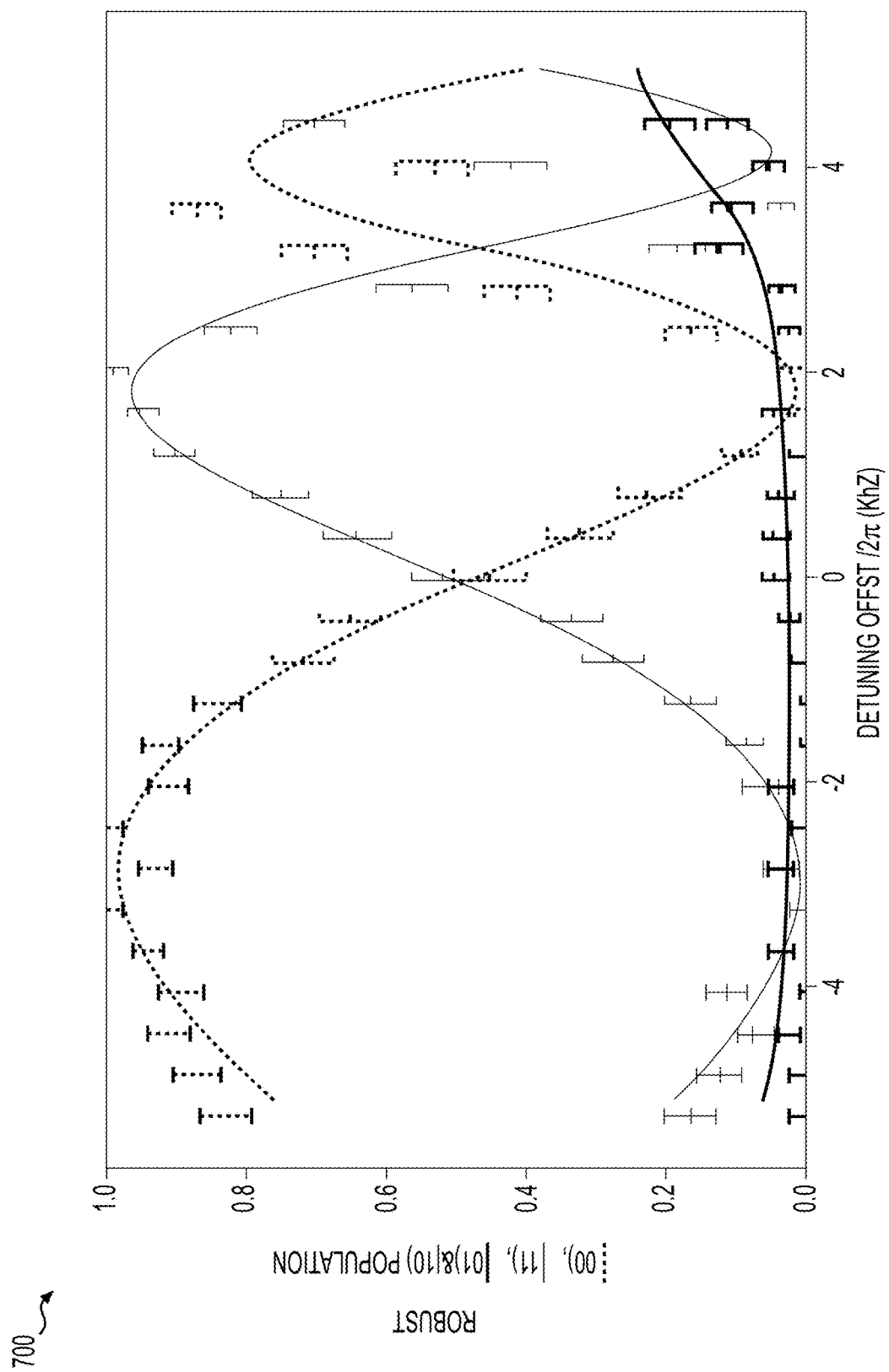
FIGS. 7A-7B are graphs depicting experimental (points) and simulated (lines) state populations over a range of detuning offsets after sequences of five discrete robust and b-robust FM pulses are applied.
Figure 7B:
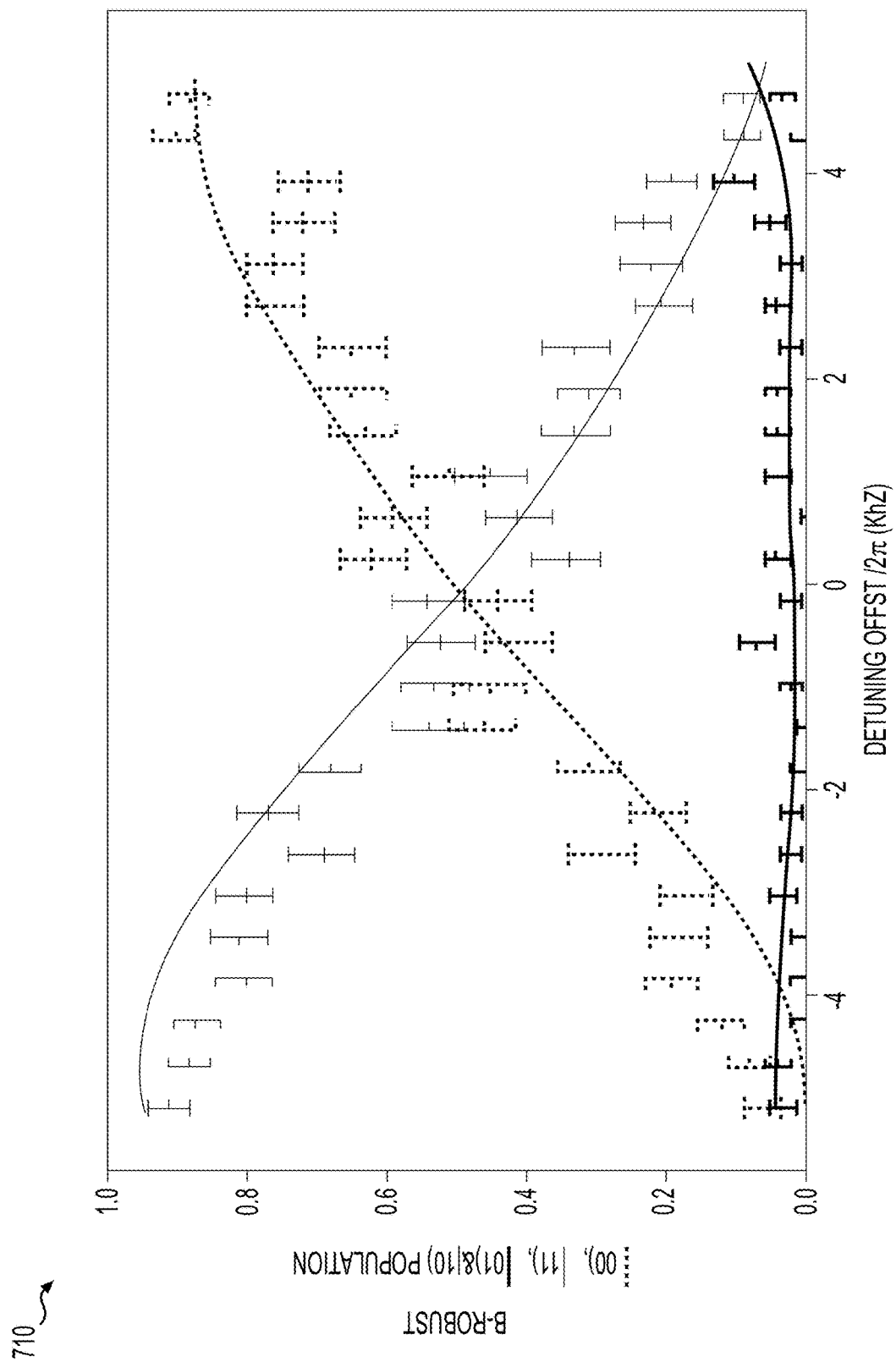
Figure 7C:
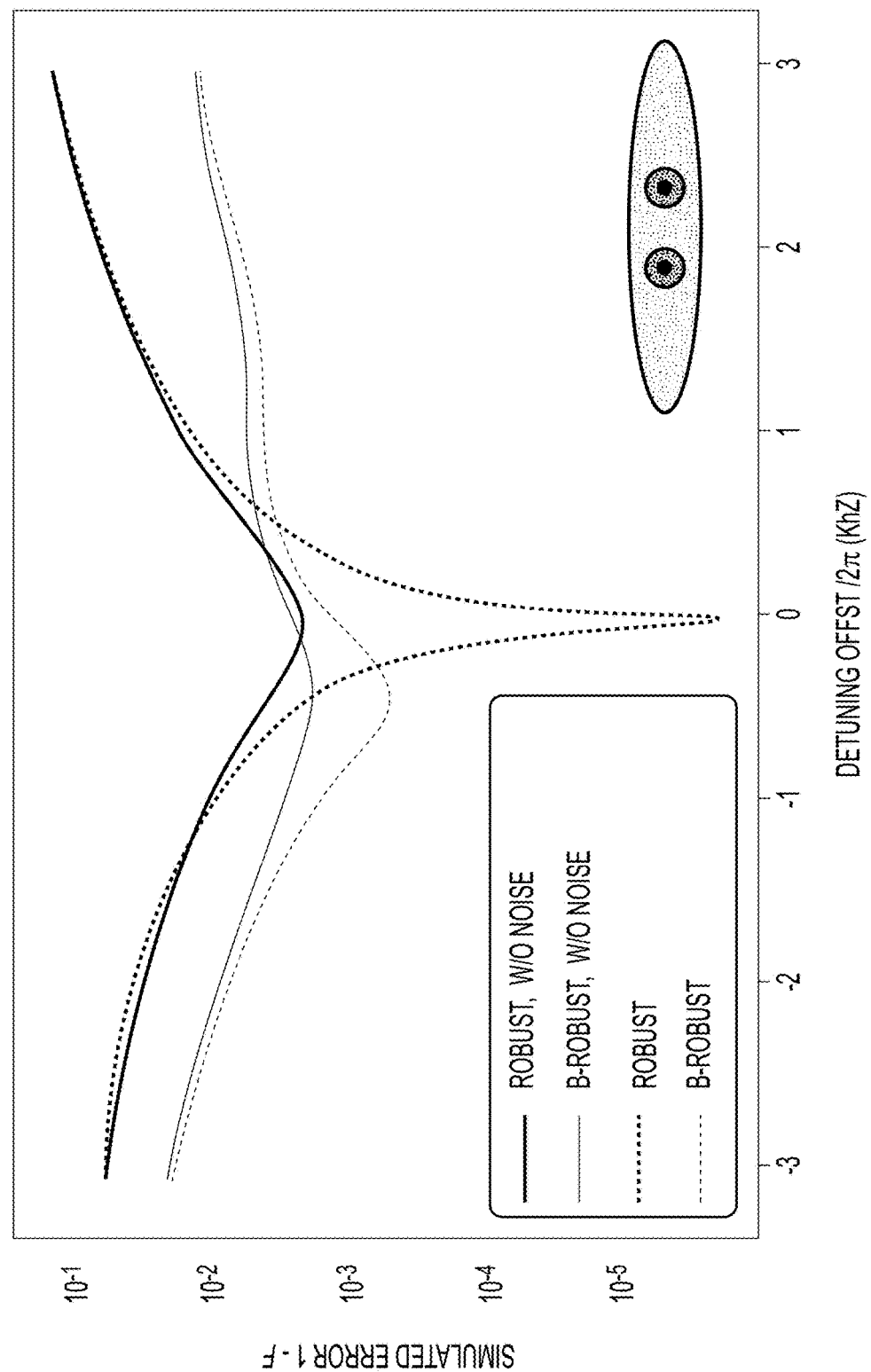
FIG. 7C is a graph of simulated MS gate errors of discrete robust and b-robust FM, both with and without dissipative noise, according to an embodiment.

FIGS. 7A-7C show exemplary experimental results, according to an embodiment. The experimental results of implementing discrete robust and b-robust FM pulses of length 120 μs on a 2-ion chain are compared in FIGS. 7A-7C. The experimental setup is a micro-fabricated surface trap, HOA 2.1, fabricated by Sandia National Laboratories. The surface trap locates at the center of a room-temperature ultra-high vacuum chamber. Then, laser beams are delivered to the trapping location and are used to cool and manipulate ion qubits. The experimental control system contains a main FPGA for logical sequences, a radio frequency system on chip for coherent qubit operations, and a multichannel stabilization servo. After initializing the qubits to the $|00\rangle$ state, a sequence of five MS gates were applied, which ideally generate the maximally entangled state $(|00\rangle + i|11\rangle)/\sqrt{2}$. To evaluate the effect of motional frequency drifts, pulses with various detuning offsets were applied. FIGS. 7A-7B show graphs 700 and 710 representing that with the b-robust FM, $|00\rangle$ and $|11\rangle$ populations deviates from 0.5 more slowly as detuning offset increases, compared to robust FM. Also, population of unwanted odd-parity states is more suppressed with b-robust pulses. Error bars represent the shot noise. Smaller slope of even-parity curves and flatter odd-parity curve indicate that b-robust FM is more robust to detuning errors than robust FM.

FIG. 7C illustrates graph 720 representing the simulated MS gate errors of discrete robust and b-robust FM, both with and without dissipative noise. Each error is averaged over a sequence of five gates. The solid lines represent simulated error with dissipative noise and dashed lines represent without dissipative noise. The equation Master equation is used to simulate MS gate under dissipative noise, which consists of motional dephasing, laser dephasing, and motional heating. The noise parameters that describe the current experiment are motional coherence time 8 ms, laser coherence time 333 ms, and motional heating rate 400 quanta/s and 40 quanta/s for center-of-mass mode and tilt mode, respectively. Although the peak gate fidelity of b-robust FM is lower than robust FM without dissipative noise, it is slightly higher (99.81%) than robust FM (99.77%) with the noise. Graph 900 of FIG. 9 further shows that b-robust FM is more robust to slow dephasing noise than robust FM, in the presence of motional frequency drifts.

The peak fidelity of b-robust FM occurs at a detuning offset 0.4 kHz. This is because optimizing over mini-batches does not necessarily set the peak fidelity to be exactly at zero detuning. Simulations with dissipative noise predict that b-robust FM has slightly lower fidelity at zero detuning (99.74%) than robust FM.

Figure 8:
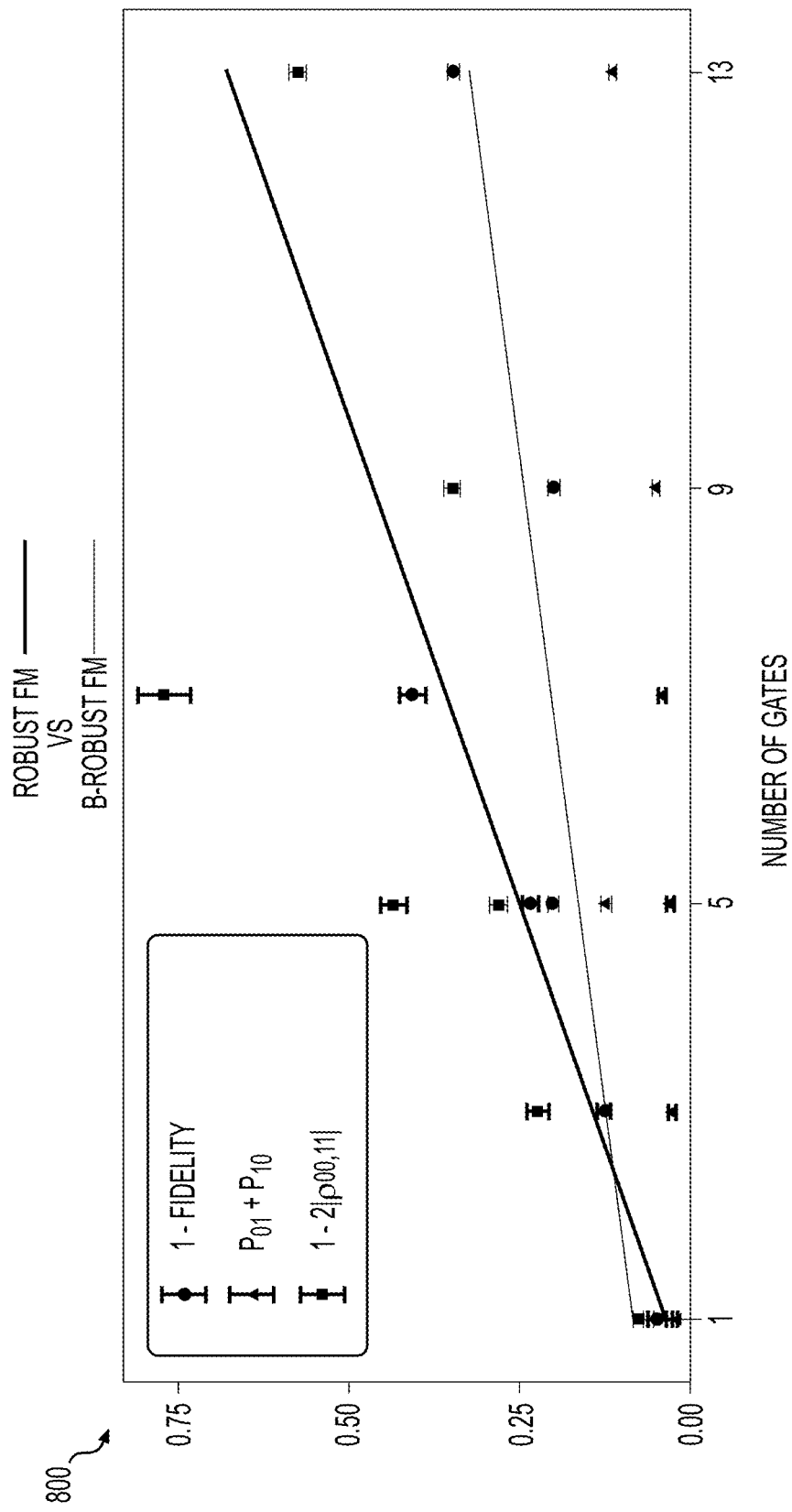
FIG. 8 is a line graph of experimental data comparing robust and b-robust FM method, according to an embodiment.

FIG. 8 shows graph 800 representing results of another exemplary embodiment. The experimental data show the advantages of the b-robust method to the conventional robust method. To measure gate error, various numbers of consecutive two-qubit gates were applied. One reason is to isolate the gate error from the error that comes from state preparation and measurement. As the gate error (1−Fidelity) builds up linearly with the number of gates, and the error during preparing the initial state and measuring the final state is constant with the number of gates, the gate error is calculated as the slope of the line. The slope of the black line shows the gate error of the conventional method and the slope of the red line shows that of the b-robust method. Accordingly, conventional method has gate fidelity (1−error) of 94.6(3)%, while the b-robust method has gate fidelity of 98.0(1)%. The experimental system is similar to the embodiment presented related to FIGS. 7A-7C, except that the surface trap chip within a miniature vacuum chamber is deployed in a cryostat which cools the ambient temperature of the trap to 4 Kelvin. The cryogenic environment reduces motional heating of trapped ions and improves vacuum.

Referring back to FIG. 9, graph 900 represents that b-robust FM is more robust to slow dephasing noise than robust FM. Minimizing the time-averaged displacement $$\|\alpha_{k,avg}^j\| \propto \frac{1}{\tau}\left|\int_0^\tau \int_0^t e^{-i\theta_k(t')}dt'\,dt\right|$$

as in robust FM achieves robustness not only to systematic frequency offsets but also to time-dependent fluctuations in motional mode frequencies and laser amplitude, as demonstrated in both simulations and experiments with phase modulation (PM). As shown below, minimizing $|\alpha_{k,avg}^j|$ achieves robustness to slow dephasing noise. The simulation results (FIG. 9) show b-robust FM is more robust to dephasing noise than robust FM in the presence of motional frequency drifts, despite only minimizing the final displacements $|\alpha_{k,avg}^j|$. Considering a time-dependent phase fluctuation $\varphi(t)$ caused by motional and/or optical dephasing noise, the fluctuation is small: $|\varphi(t)| \ll 1$ ($0 \le t \le \tau$). It was also assumed that the fluctuation is slow compared to the inverse gate time:

$$\varphi(t) = \frac{1}{\sqrt{2\pi}}\int_{-\infty}^\infty \tilde{\varphi}(\omega)e^{i\omega t}d\omega \approx \frac{1}{\sqrt{2\pi}}\int_{-\omega_c}^{\omega_c}\tilde{\varphi}(\omega)e^{i\omega t}d\omega \quad (A1)$$

where $\tilde{\varphi}(\omega)$ is the Fourier transform of $\varphi(t)$ and $\omega_c \ll 1/\tau$ is the cutoff frequency. It was assumed that there is no dephasing noise, where the final displacement is set to zero. Replacing the phase $\theta(t)$ with $\theta(t)+\varphi(t)$, the displacement was evaluated by:

$$\alpha_k^j(\tau) \propto \int_0^\tau e^{-i(\theta_k(t)+\varphi(t))} dt \approx \int_0^\tau e^{-i\theta_k(t)}(1-i\varphi(t))dt =$$

$$-i\int_0^\tau e^{-i\theta_k(t)}\varphi(t)dt \approx \frac{-i}{\sqrt{2\pi}}\int_{-\omega_c}^{\omega_c} d\omega \tilde{\varphi}(\omega)e^{i\omega t}\int_0^\tau dt e^{-i\theta_k(t)} \approx$$

$$\frac{-i}{\sqrt{2\pi}}\int_{-\omega_c}^{\omega_c} d\omega \tilde{\varphi}(\omega)\int_0^\tau dt e^{-i\theta_k(t)}(1+i\omega t) =$$

$$\frac{1}{\sqrt{2\pi}}\int_{-\omega_c}^{\omega_c} d\omega \omega \tilde{\varphi}(\omega)\int_0^\tau dt t e^{-i\theta_k(t)} = \frac{1}{\sqrt{2\pi}}\int_{-\omega_c}^{\omega_c} d\omega \omega \tilde{\varphi}(\omega)\int_0^\tau dt \int_0^t dt' e^{-i\theta_k(t')}$$

$$\propto \alpha_{k,avg}^j \quad (A2)$$

where in the second to last step integration by parts was performed. Therefore, $\alpha_{k,avg}^j \approx 0$ achieves first-order robustness to slow dephasing noise. To evaluate the robustness to slow dephasing noise in the presence of motional frequency drifts, the time-averaged displacements averaged over a test set of motional frequency uncertainty ε was computed by:

$$C_\varepsilon^{avg} = \frac{1}{|T_\varepsilon|}\sum_{\epsilon \in T_\varepsilon} C^{avg}(\epsilon)$$

$$C^{avg}(\epsilon) = \sum_k \left(\alpha_{k,avg}^{j1}(\epsilon)^2 + \alpha_{k,avg}^{j2}(\epsilon)^2\right) \quad (A3)$$

Figure 9:
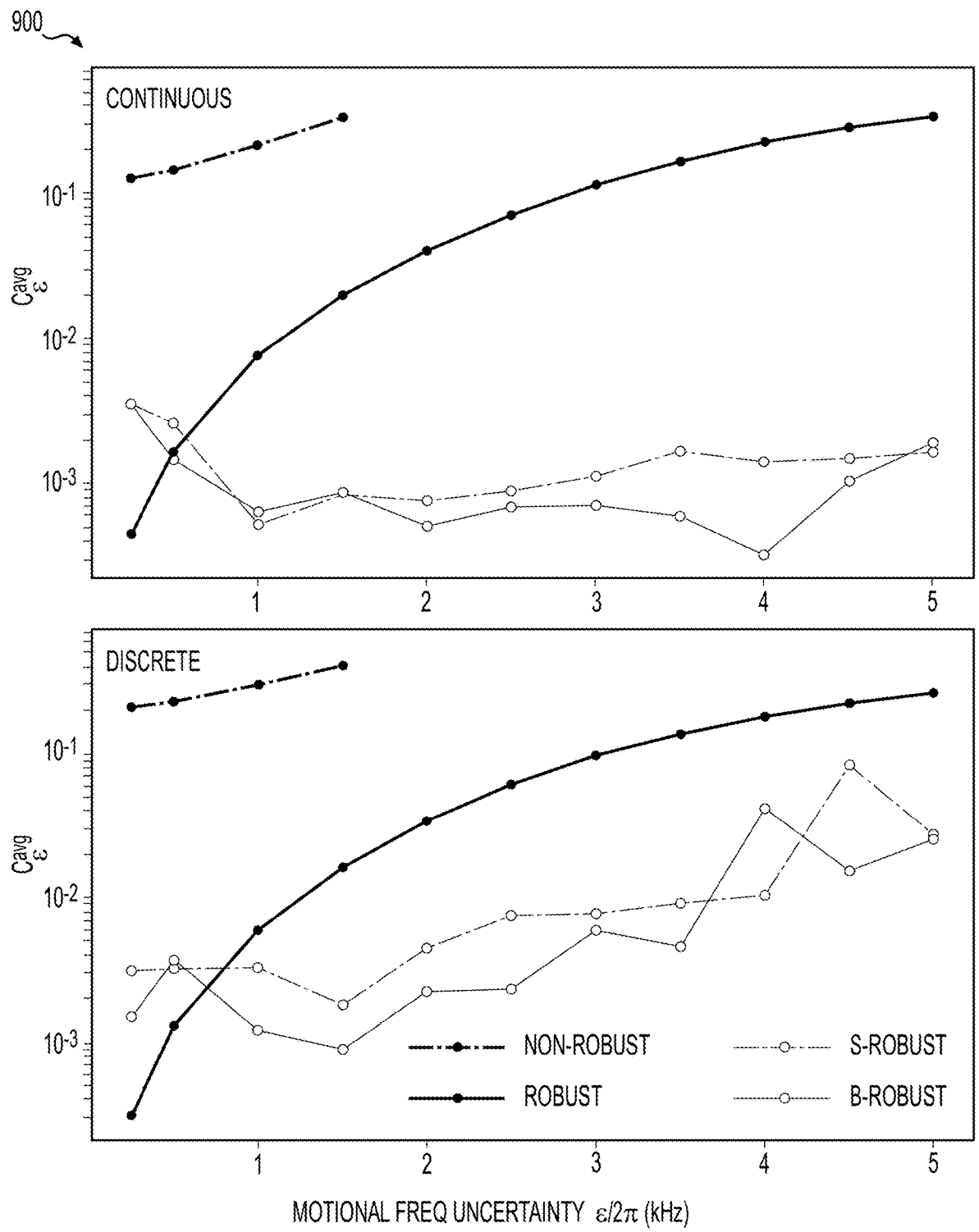
FIG. 9 is a graph of $C_\epsilon^{avg}$ of pulses optimized by non-robust, robust, s-robust, and b-robust FM with respect to $\epsilon$, according to an embodiment.

FIG. 9 shows time-averaged displacements averaged over test set of offsets drawn from distributions of various uncertainties ε. In other words, FIG. 9 shows $C_\varepsilon^{avg}$ of pulses optimized by non-robust, robust, s-robust, and b-robust FM, for various uncertainties ε. Similar to FIG. 4A, 200 μs pulse was used on the first two ions of a four-ion chain. As a result, s-robust and b-robust pulses have significantly smaller $C_\varepsilon^{avg}$ than robust FM when ε/2π≥1 kHz. While s-robust and b-robust FM minimize the final displacements over the uncertainty range, they naturally minimize the time-averaged displacements to satisfy the condition for robustness to motional frequency offsets. This also leads to robustness to dephasing noise, which shares the same condition. Except when E is too small, s-robust and b-robust FM have significantly smaller time-averaged displacements than robust FM. The results implies that s-robust and b-robust FM are more robust to dephasing noise in the presence of motional frequency drifts. Notably, for continuous b-robust FM, $C_\varepsilon^{avg} < 10^{-3}$ when 1 kHz≤ε/2π≤4 kHz. Accordingly, it leads to the displacement errors reduced by one to two orders of magnitude compared to robust FM, because the displacement errors are proportional to the time-averaged displacements. In this range, the rotation angle errors of the b-robust pulse dominate the displacement errors.

Figure 10:
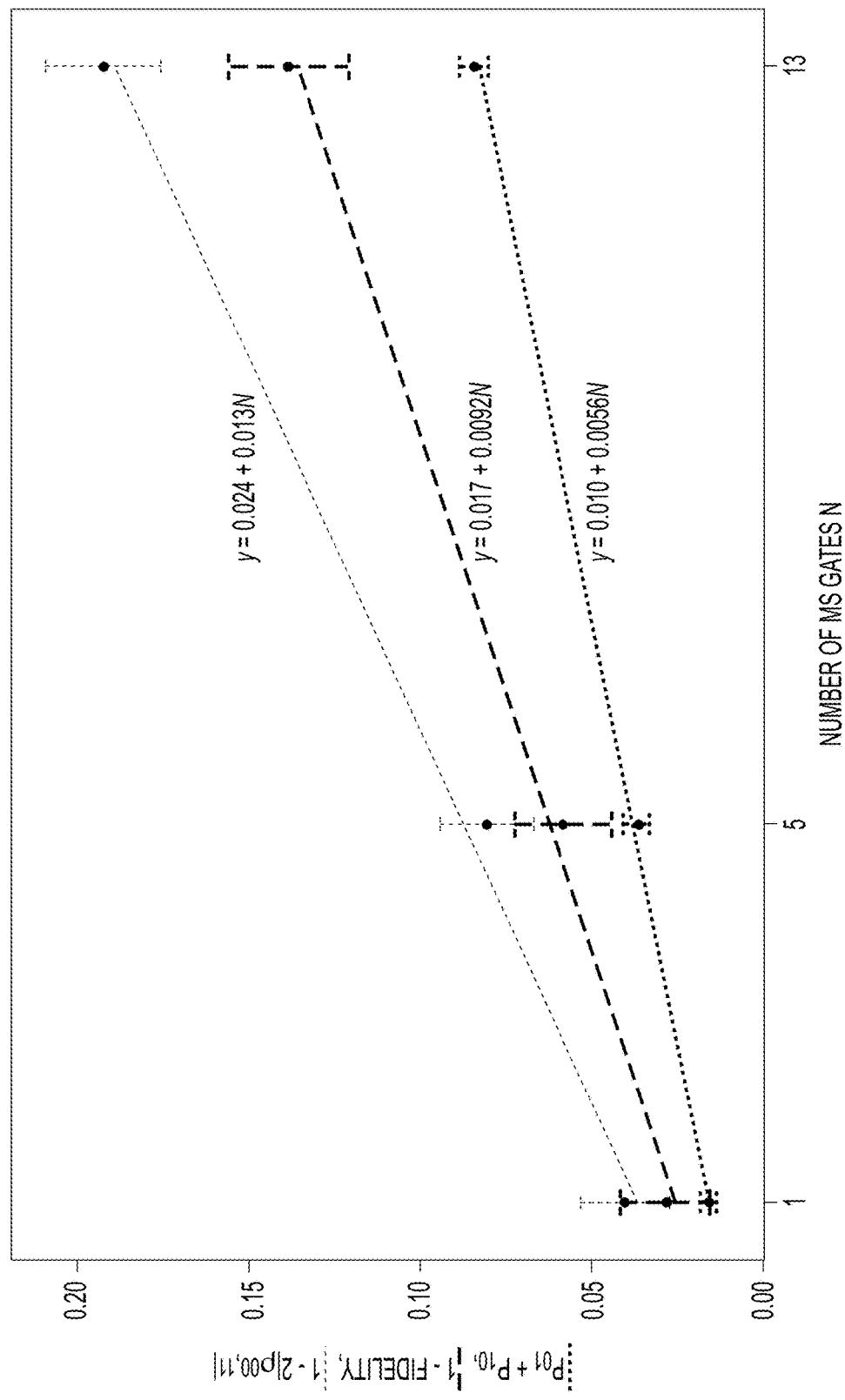
FIG. 10 is a graph of experimental data of the maximally entangled state generated by sequences of repeated MS gates.
Figure 11:
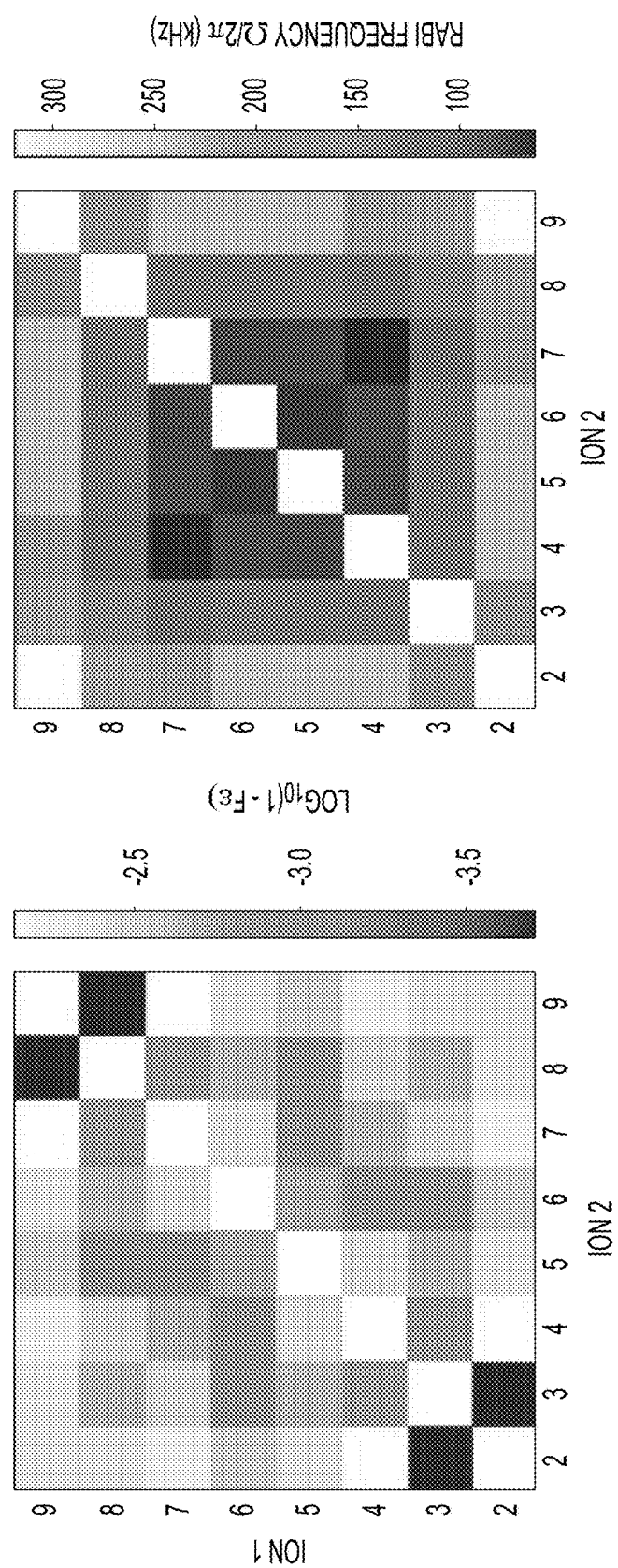
FIG. 11 is a graph of connectivity of a 10-ion chain with MS gate for each ion pair is optimized with continuous b-robust FM of pulse length 400 μs, according to an embodiment.

FIGS. 10-11 show that the b-robust FM pulse in a two-ion chain achieves MS gate fidelity 99.08(7)% in the experiment. The experimental setup is similar to the setup explained in relation to FIGS. 7A-7C. This is lower than the MS gate fidelity 99.49(7)% which uses robust FM pulse on the same system. The gate operates at zero-detuning, calibrated to the point where crossover between the populations of |00⟩ and |11⟩ states occurs in the experiment described in FIG. 7B. The gate suffers from the high heating rate of the transverse center-of-mass mode and the off-resonant coupling to the motional modes of other directions, which wasn't considered in the gate pulse design. The gate fidelity improves when the trap is operated at a higher RF voltage, which corresponds to higher transverse mode frequency, lower heating rate, and smaller off-resonant coupling.

Referring back to FIG. 10, graph 1000, in that experiment the qubits were initially set to |00⟩ and then a sequence of 1, 5, and 13 MS gates were applied to generate the maximally entangled state (|00⟩+i|11⟩)/√2. Population of |01⟩ and |10⟩ states and parity contrast are used to measure the state fidelity. That is, the lower, higher, and middle points/lines represent the population leakage to |01⟩ and |10⟩ states, the loss of parity contrast, and the final state error, respectively, and gate error is given by the slope of the middle points' linear fit. Using that the stochastic error accumulates linearly, coherent error accumulates quadratically, and the state preparation and measurement (SPAM) error remains constant, the gate fidelity without the SPAM error from the linear fit was calculated. Based on FIG. 10, the gate fidelity of 99.08(7)% is measured. The experimental data agree with the linear fit, indicating negligible coherent error.

To understand the performance of b-robust FM in a larger system, FIG. 11 shows graph 1100 representing simulated data of the connectivity of a 10-ion chain. MS gate for each ion pair is optimized with continuous b-robust FM of pulse length 400 μs. The ions at the edges (1 and 10) are not used. Accordingly, a fully-connected 8-qubit device with fidelities ranging from 0.993 to 0.9998 is achievable, even with uncertainty ε=2π 0.5 kHz in the motional mode frequencies. Larger Rabi frequency may be required for pairs that include the ion(s) close to the edges (2 or 9), due to smaller participation in the excited modes. One way to achieve this is by choosing the frequency offset of the initial guess pulse and shaping the trap potential to have evenly spaced ions.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

What is claimed is:

1. A method for optimizing two-qubit gates performance in a quantum circuit of a quantum computing system, comprising: selecting, from a plurality of qubits in the quantum circuit, a pair of target qubits on which to perform a quantum gate operation; selecting, from the plurality of qubits, a second plurality of qubits on which to introduce an intentional noise; applying the intentional noise to the second plurality of qubits via a numerical optimizer; determining frequencies of the qubits of the second plurality of qubits; determining an optimized frequency based on the applied intentional noise, wherein the optimized frequency is a function of the frequencies of the qubits of the second plurality of qubits; and performing the quantum gate operation by modifying the pair of target qubits frequency to the optimized frequency.

2. The method of claim 1, wherein the quantum gate operation is a quantum entanglement gate operation.

3. The method of claim 1, wherein the intentional noise is a change in at least one of a laser phase, laser intensity, laser amplitude, or laser frequency.

4. The method of claim 1, wherein the optimized frequency is configured to correct any phase deviation that results in the pair of target qubits error.

5. The method of claim 1, further comprising:
   selecting a third plurality of qubits, from the plurality of qubits, in the quantum circuit;
   applying a second intentional noise with the numerical optimizer on the third plurality of qubits; and
   determining frequencies of the third plurality of qubits.

6. The method of claim 5, wherein the optimized frequency is a function of the frequencies of the qubits of the second plurality of qubits and the frequencies of the qubits of the third plurality of qubits.

7. The method of claim 1, wherein the optimized frequency is an optimized pulse frequency and wherein performing the quantum gate operation further comprises applying the optimized pulse frequency to the pair of target qubits.

8. A quantum computing system, comprising: a quantum circuit; one or more processors; and a memory having a plurality of instructions, which, when executed by the one or more processors, causes the quantum computing system to: select, from a plurality of qubits in the quantum circuit, a pair of target qubits on which to perform a quantum gate operation, select, from the plurality of qubits, a second plurality of qubits on which to introduce an intentional noise, apply the intentional noise to the second plurality of qubits via a numerical optimizer, determine frequencies of the qubits of the second plurality of qubits, determine an optimized frequency based on the applied intentional noise, wherein the optimized frequency is a function of the frequencies of the qubits of the second plurality of qubits, and perform the quantum gate operation by modifying the pair of target qubits frequency to the optimized frequency.

9. The quantum computing system of claim 8, wherein the quantum gate operation is a quantum entanglement gate operation.

10. The quantum computing system of claim 8, wherein the intentional noise is a change in at least one of a laser phase, laser intensity, laser amplitude, or laser frequency.

11. The quantum computing system of claim 8, wherein the optimized frequency is configured to correct any phase deviation that results in the pair of target qubits error.

12. The quantum computing system of claim 8, wherein the plurality of instructions further causes the quantum computing system to:
   select a third plurality of qubits, from the plurality of qubits, in the quantum circuit;
   apply a second intentional noise with the numerical optimizer on the third plurality of qubits; and
   determine frequencies of the third plurality of qubits.

13. The quantum computing system of claim 8, wherein the optimized frequency is an optimized pulse frequency and wherein performing the quantum gate operation further comprises applying the optimized pulse frequency to the pair of target qubits.

14. A non-transitory computer-readable storage medium having instructions stored thereon, wherein the instructions when executed by a processor, cause the processor to: select, from a plurality of qubits in the quantum circuit, a pair of target qubits on which to perform a quantum gate operation; select, from the plurality of qubits, a second plurality of qubits on which to introduce an intentional noise; apply the intentional noise to the second plurality of qubits via a numerical optimizer; determine frequencies of the qubits of the second plurality of qubits; determine an optimized frequency based on the applied intentional noise, wherein the optimized frequency is a function of the frequencies of the qubits of the second plurality of qubits; and perform the quantum gate operation by modifying the pair of target qubits frequency to the optimized frequency.

15. The non-transitory computer-readable storage medium of claim 14, wherein the quantum gate operation is a quantum entanglement gate operation.

16. The non-transitory computer-readable storage medium of claim 14, wherein the intentional noise is a change in at least one of a laser phase, laser intensity, laser amplitude, or laser frequency.

17. The non-transitory computer-readable storage medium of claim 14, wherein the optimized frequency is configured to correct any phase deviation that results in the pair of target qubits error.

* * * * *